United States Patent
Ebe et al.

(10) Patent No.: US 11,773,237 B2
(45) Date of Patent: Oct. 3, 2023

(54) RESIN COMPOSITION, MOLDED ARTICLE AND HEAT-EXPANDABLE MICROSPHERES

(71) Applicant: MATSUMOTO YUSHI-SEIYAKU CO., LTD., Yao (JP)

(72) Inventors: Takumi Ebe, Yao (JP); Katsushi Miki, Yao (JP)

(73) Assignee: MATSUMOTO YUSHI-SEIYAKU CO., LTD., Osaka (JP)

( * ) Notice: Subject to any disclaimer, the term of this patent is extended or adjusted under 35 U.S.C. 154(b) by 349 days.

(21) Appl. No.: 16/954,576

(22) PCT Filed: Dec. 14, 2018

(86) PCT No.: PCT/JP2018/046015
§ 371 (c)(1),
(2) Date: Jun. 17, 2020

(87) PCT Pub. No.: WO2019/124233
PCT Pub. Date: Jun. 27, 2019

(65) Prior Publication Data
US 2020/0332085 A1 Oct. 22, 2020

(30) Foreign Application Priority Data
Dec. 21, 2017 (JP) .................. 2017-244648

(51) Int. Cl.
| | |
|---|---|
| *C08K 9/10* | (2006.01) |
| *B29C 44/50* | (2006.01) |
| *B29C 44/02* | (2006.01) |
| *C08J 3/22* | (2006.01) |
| *C08J 9/32* | (2006.01) |
| *C08K 5/01* | (2006.01) |
| *C08L 23/00* | (2006.01) |
| *B29K 21/00* | (2006.01) |
| *B29K 105/16* | (2006.01) |
| *B29L 7/00* | (2006.01) |

(52) U.S. Cl.
CPC ............... *C08K 9/10* (2013.01); *B29C 44/02* (2013.01); *B29C 44/505* (2016.11); *C08J 3/22* (2013.01); *C08J 9/32* (2013.01); *C08K 5/01* (2013.01); *C08L 23/00* (2013.01); *B29K 2021/003* (2013.01); *B29K 2105/165* (2013.01); *B29L 2007/002* (2013.01); *C08J 2339/06* (2013.01)

(58) Field of Classification Search
CPC ...... C08K 9/10; C08K 5/01; C08J 3/22; C08J 3/932; C08J 2339/06; C08L 23/00
See application file for complete search history.

(56) References Cited

U.S. PATENT DOCUMENTS

| | | | |
|---|---|---|---|
| 3,615,972 | A | 10/1971 | Morehouse, Jr. et al. |
| 6,235,800 | B1 | 5/2001 | Kyuno et al. |
| 2005/0026067 | A1 | 2/2005 | Masuda et al. |
| 2009/0149559 | A1 | 6/2009 | Masuda et al. |
| 2010/0120929 | A1 | 5/2010 | Naito et al. |
| 2010/0204349 | A1 | 8/2010 | Inohara et al. |
| 2014/0364521 | A1 | 12/2014 | Tayagaki et al. |

FOREIGN PATENT DOCUMENTS

| | | | | |
|---|---|---|---|---|
| CN | 101550215 A | 10/2009 | | |
| CN | 104053681 A | 9/2014 | | |
| EP | 0 484 893 A2 | 5/1992 | | |
| EP | 484893 B1 * | 8/1997 | ................ | C08J 9/32 |
| EP | 1067151 A1 * | 1/2001 | ............ | B01J 13/025 |
| EP | 1 947 121 A1 | 7/2008 | | |
| EP | 1952881 A1 * | 8/2008 | ............. | B01J 13/14 |
| EP | 2151456 A1 * | 2/2010 | ............. | B01J 13/14 |
| EP | 2204428 A1 * | 7/2010 | ............. | B01J 13/14 |
| JP | 42-026524 B1 | 12/1967 | | |
| JP | 4-178442 A | 6/1992 | | |
| JP | 9-019635 A | 1/1997 | | |
| JP | 2008-255294 A | 10/2008 | | |
| JP | 2016-050295 A | 4/2016 | | |
| SE | 1851088 A1 | 10/2018 | | |
| WO | 99/046320 A1 | 9/1999 | | |
| WO | 03/099955 A1 | 12/2003 | | |
| WO | 2007/058379 A1 | 5/2007 | | |
| WO | 2008/142849 A1 | 11/2008 | | |
| WO | 2009/050863 A1 | 4/2009 | | |
| WO | 2017/141653 A1 | 8/2017 | | |

OTHER PUBLICATIONS

Communication dated Feb. 25, 2021 from the Swedish Patent and Registration Office in SE Application No. 2050913-9.
Communication dated Mar. 7, 2022 from the Chinese Patent Office in Chinese Application No. 201880082585.2.
International Search Report for PCT/JP2018/046015 dated Mar. 12, 2019 (PCT/ISA/210).

* cited by examiner

*Primary Examiner* — Edward J Cain
(74) *Attorney, Agent, or Firm* — Sughrue Mion, PLLC

(57) ABSTRACT

A resin composition containing heat-expandable microspheres including a thermoplastic resin shell and a thermally vaporizable blowing agent encapsulated therein and at least one base resin selected from rubbers, olefin resins and thermoplastic elastomers. The thermoplastic resin is a polymer of a polymerizable component containing N-substituted maleimide and a nitrile monomer containing methacrylonitrile. Also disclosed are molded articles manufactured by molding the resin composition.

20 Claims, 2 Drawing Sheets

RESIN COMPOSITION, MOLDED ARTICLE AND HEAT-EXPANDABLE MICROSPHERES

CROSS-REFERENCE TO RELATED APPLICATIONS

This application is a § 371 of International Application No. PCT/JP2018/046015 filed Dec. 14, 2018 which claims priority from Japanese Patent Application No. 2017-244648 filed Dec. 21, 2017.

BACKGROUND OF THE INVENTION

1. Field of the Invention

The present invention relates to a resin composition, a molded article and heat-expandable microspheres.

2. Description of the Related Art

Heat-expandable microcapsules (heat-expandable microspheres) are employed in a wide range of applications such as a designing additive for foamable inks or wallpapers and lightweight fillers for resins and paints owing to their expansion property by heating. Of those applications, various developments have been achieved relating to lightweight fillers for resins.

Such heat-expandable microspheres comprise a thermoplastic resin shell and a blowing agent encapsulated therein. The thermoplastic resin usually used includes vinylidene chloride copolymers, acrylonitrile copolymers and acrylate ester copolymers. The blowing agent mainly includes hydrocarbons such as isobutane and isopentane (refer to PTL 1).

Recently, highly heat-resistant heat-expandable microspheres have been studied. For example, PTL 2 discloses heat-expandable microspheres that encapsulate a blowing agent with a thermoplastic resin shell containing at least 80 wt % of a nitrile monomer, at most 20 wt % of a non-nitrile monomer and 0.1 to 1 wt % of a cross-linking agent, where the non-nitrile monomer is selected from methacrylate esters and acrylate esters and the resultant heat-expandable microspheres expand at a temperature ranging from 160 to 180° C. and do not expand below 140° C. to exhibit high heat resistance.

PTL 3 also discloses highly heat-resistant heat-expandable microspheres comprising a shell of a polymer produced by polymerizing a monomer mixture containing a nitrile monomer (I), a monomer (II) having one unsaturated double bond and carboxyl group per molecule, a monomer (III) having at least two polymerizable double bonds per molecule and optionally a monomer (IV) that is different from and polymerizable with the monomers (I), (II) and (III) and a blowing agent encapsulated in the shell. The resultant heat-expandable microspheres are highly heat-resistant and exhibit good expansion performance in a high temperature range to be employed in extrusion molding and injection molding of various resins.

[PTL 1] Japanese Patent Publication 1967-26524
[PTL 2] Japanese Patent Application Publication 1997-19635
[PTL 3] WO 2003-099955

3. Problems to be Solved by the Invention

The heat-expandable microspheres like those disclosed in PTL 2, however, have been found to have insufficient heat resistance that results in a failure in lightening molded articles and poor appearance of molded articles, such as a stripped or fuzzy surface. In other words, a molded article having a peeled surface results when such composition comprising the heat-expandable microspheres and a resin is extrusion-molded.

On the other hand, the heat-expandable microspheres like those disclosed in PTL 3 have been found to cause a poor appearance of molded articles, such as peeled surface. This is due to improper expansion of the microspheres in a base resin when a composition comprising the heat-expandable microspheres and the base resin is extrusion-molded, though the microspheres lighten the molded articles. The peeled surface was found to make the molded articles brittle and broken during the molding to thereby inhibit stable molding operation.

Conventional resin compositions comprising a base resin and heat-expandable microspheres have not succeeded in preventing the poor appearance of extrusion-molded articles caused by a peeled surface.

SUMMARY OF THE INVENTION

It is therefore an object of the present invention to provide a resin composition which prevents surface peeling of resultant molded articles, molded articles manufactured by molding the resin composition and heat-expandable microspheres contained in the resin composition.

After diligent study for solving the above problems, the present inventors found that a molded article with no or a minimum peeled surface can be manufactured from a resin composition comprising at least one base resin selected from rubbers, olefin resins and thermoplastic elastomers and heat-expandable microspheres having a thermoplastic resin shell obtained by polymerizing a prescribed polymerizable component, to thereby achieve the present invention.

The above objects of the present invention have been achieved by providing a resin composition comprising at least one base resin selected from rubbers, olefin resins and thermoplastic elastomers and heat-expandable microspheres. The heat-expandable microspheres a comprise a thermoplastic resin shell and a thermally vaporizable blowing agent encapsulated therein, and the thermoplastic resin is a polymer of a polymerizable component containing N-substituted maleimide and a nitrile monomer containing methacrylonitrile.

In preferred embodiments of the present invention, the resin composition satisfies at least one of the following requirements 1) to 6).

1) The base resin is an olefin elastomer.
2) The polymerizable component satisfies the condition 1 described below.
   Condition 1: The amounts of the methacrylonitrile and N-substituted maleimide in the polymerizable component are represented by the following formula (I):

$$\text{Amount of N-substituted maleimide/amount of methacrylonitrile} \geq 0.33 \quad \text{Formula (I)}$$

3) The heat-expandable microspheres evaluated under the following condition 2 simultaneously satisfy properties (a) to (e) below.
   Condition 2: The heat-expandable microspheres are classified by sifting through sieves of openings of 25 μm, 32 μm, 38 μm, 45 μm and 53 μm and each fraction is evaluated as A containing 0 to 10% of microspheres having at least one resin particle inside the shell; B containing over 10 to 30% of such microspheres; C containing over 30 to 70% of such microspheres; D containing over 70 to 90% of such microspheres; and E containing over 90 to 100% of such microspheres.
(a) Heat-expandable microspheres having a particle size ranging from 45 to 53 μm result in one of the evaluations of A to C.
(b) Heat-expandable microspheres having a particle size ranging from 38 μm to 45 μm result in one of the evaluations of A to C.
(c) Heat-expandable microspheres having a particle size ranging from 32 μm to 38 μm result in the evaluation of A or B.
(d) Heat-expandable microspheres having a particle size ranging from 25 μm to 32 μm result in the evaluation of A or B.
(e) Heat-expandable microspheres having a particle size smaller than 25 μm result in the evaluation of A.
4) The blowing agent contains a hydrocarbon having 8 carbon atoms.
5) The blowing agent further contains at least one hydrocarbon selected from hydrocarbons having 4 to 7 carbon atoms.
6) The blowing agent further contains at least one hydrocarbon selected from hydrocarbons having at least 9 carbon atoms.

The heat-expandable microspheres of the present invention comprise a thermoplastic resin shell and a thermally vaporizable blowing agent encapsulated therein, wherein the thermoplastic resin is a polymer of a polymerizable component containing N-substituted maleimide and a nitrile monomer containing methacrylonitrile and the polymerizable component satisfies the condition 1 described below.

Condition 1: The amounts of the methacrylonitrile and N-substituted maleimide in the polymerizable component are represented by the following formula (I):

Amount of N-substituted maleimide/amount of methacrylonitrile≥0.33    Formula (I)

In a second aspect, the present invention provides heat-expandable microspheres which satisfy at least one of the requirements 3) to 6) mentioned above.

In a preferred embodiment, the heat-expandable microspheres of the present invention are suitable for molding.

In a third aspect, the present invention provides wet-powdery heat-expandable microspheres which comprise the heat-expandable microspheres mentioned above and a liquid compound.

The resin composition of the present invention preferably is in a form of a masterbatch.

In a fourth aspect, the present invention provides a molded articles of the present invention are manufactured by molding the resin composition or by molding a mixture containing the resin composition in a form of a masterbatch and a matrix resin.

In yet another preferred embodiment, the molded articles of the present invention are manufactured by extrusion-molding the resin composition or by extrusion-molding a mixture containing the resin composition in a form of a masterbatch and a matrix resin.

The molded article of the present invention is preferably used as a sealing material for construction and automobiles, wall papers, shoe soles and floor materials.

Advantageous Effects of Invention

The resin composition of the present invention can be manufactured into molded articles having no or a minimum peeled surface.

The molded articles of the present invention have good appearance with no or a minimum peeled surface.

The heat-expandable microspheres of the present invention can be manufactured into molded articles with no or a minimum peeled surface.

REFERENCE SYMBOLS LIST

Figure 1:
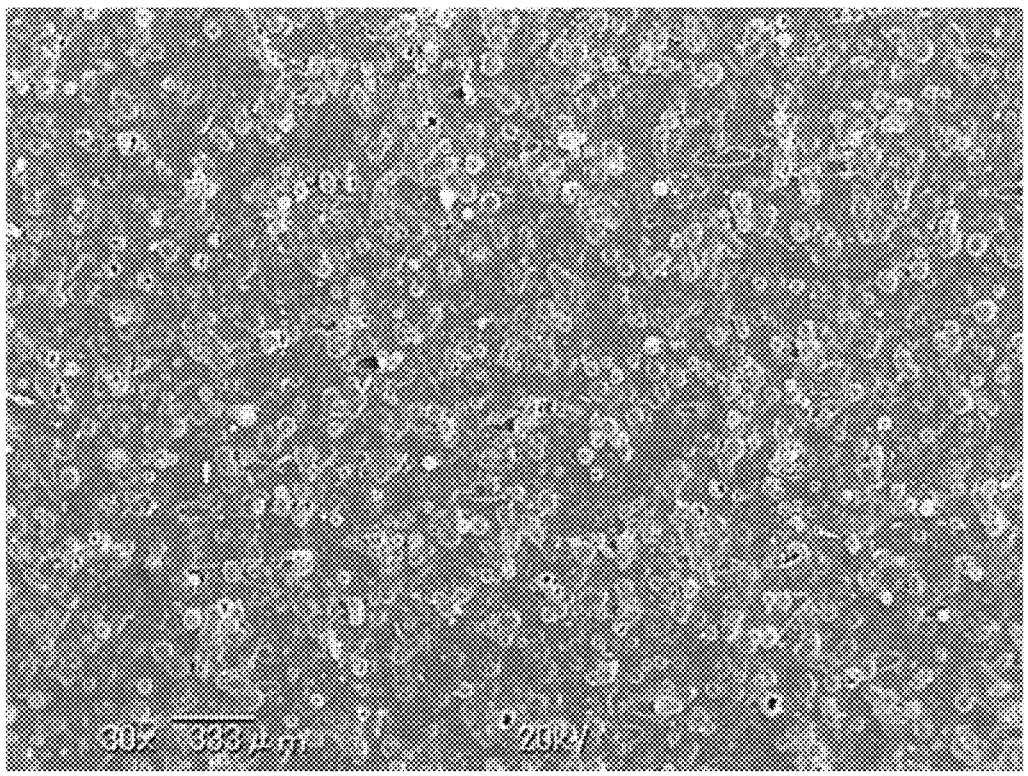
FIG. 1 is an electron micrograph showing the surface of the molded article manufactured in Example 2-1.

Reference symbols used to identify various features in the drawings include the following.
11: A thermoplastic resin shell
12: Blowing agent
13: Resin particles of a thermoplastic resin

DETAILED DESCRIPTION OF THE PREFERRED EMBODIMENTS

The resin composition of the present invention comprises at least one base resin selected from rubbers, olefin resins and thermoplastic elastomers and specific heat-expandable microspheres. Each ingredient is described in detail as follows. However, the present invention should not be construed as being limited thereto.

Base Resin

The base resin is at least one selected from rubbers, olefin resins and thermoplastic elastomers.

The rubbers include, for example, diene rubbers such as natural rubbers, isoprene rubber, butadiene rubber, styrene-butadiene rubber, chloroprene rubber, acrylonitrile butadiene rubber, ethylene-α-olefin copolymer rubber, ethylene-α-olefin-nonconjugated diene copolymer rubber, halogenated ethylene-α-olefin-nonconjugated diene copolymer rubber, sulfonated ethylene-α-olefin-nonconjugated diene copolymer rubber, maleated ethylene-α-olefin-nonconjugated diene copolymer rubber, butyl rubber and isobutylene-isoprene rubber; and non-diene rubbers such as hydrogenated nitrile rubber, urethane rubber, silicone rubber, chlorosulfonated polyethylene, chlorinated polyethylene, acrylic rubber, epichlorohydrin rubber, fluororubber, polysulfide rubber and propylene oxide rubber.

The olefin resin includes, for example, polyethylene resins such as ethylene-vinyl alcohol copolymer, ethylene-vinyl acetate copolymer, silane-crosslinked ethylene-vinyl acetate copolymer, ethylene-methyl(meth)acrylate copolymer, ethylene-ethyl(meth)acrylate copolymer, ethylene-butyl(meth)acrylate copolymer, ethylene-methacrylic acid copolymer, low density polyethylene (LDPE), silane-crosslinked low density polyethylene, linear low density polyethylene (L-LDPE), silane-crosslinkable linear low density polyethylene, high density polyethylene (HDPE), silane-crosslinkable high density polyethylene, chlorinated polyethylene and polyethylene modified with carboxylic anhydride such as maleic anhydride; polypropylene resins such as polypropylene, silane-crosslinkable polypropylene and polypropylene modified with carboxylic anhydride such as maleic anhydride; and other resins such as polybutene, polyisobutylene, polymethylpentene and acrylonitrile-butadiene-styrene copolymer (ABS resin). Acrylate and methacrylate will be collectively referred to as (meth)acrylate and (meth)acrylate will mean acrylate or methacrylate in the following description.

The term, "silane-crosslinkable", herein means that a silane-coupling agent is grafted to an olefin resin. The silane-coupling agent in the silane-crosslinkable olefin resin is hydrolyzed by contact with water to generate silanol groups. The silanol groups are then condensation-polymerized to crosslink the resin and the properties of the resin including mechanical properties such as tenacity, chemical properties such as solvent resistance and thermal properties such as heat resistance are improved.

The thermoplastic elastomer includes a mixture of a polymer composed of a hard segment and a polymer composed of a soft segment and a copolymer of a polymer composed of a hard segment and a polymer composed of a soft segment.

The thermoplastic elastomer includes, for example, urethane elastomers, styrene elastomers, olefin elastomers, polyamide elastomers, polyester elastomers, nitrile elastomers and vinyl chloride elastomers.

The hard segment of the urethane elastomers includes, for example, polyurethane generated by the reaction of a diisocyanate and a chain extender such as a short chain diol. The soft segment of the elastomers includes, for example, polymer diols such as polyester diols, polyether diols and polycarbonate diols. The urethane elastomers are block copolymers composed of polyurethane and a polymer diol.

The urethane elastomers include "RESAMINE™" produced by Dainichiseika Color & Chemicals Mfg. Co., Ltd., Miractran™ produced by Tosoh Corporation, Elastollan™ produced by BASF Japan Ltd., "ESTANE™" produced by The Lubrizol Corporation, "Desmopan™" and "Texin™" produced by DIC Covestro Polymer Ltd. and "MAXIRON" produced by Showa Kasei Kogyo Co., Ltd.

The hard segment of the styrene elastomers includes, for example, a segment composed of a polystyrene. The soft segment of the elastomers includes, for example, a segment composed of a polybutadiene, hydrogenated polybutadiene, polyisoprene or hydrogenated polyisoprene. Such styrene elastomers include, for example, block copolymers such as styrene-butadiene-styrene (SBS) copolymer, styrene-isoprene-styrene (SIS) copolymer, styrene-ethylene-butylene-styrene (SEBS) copolymer, styrene-ethylene-propylene-styrene (SEPS) copolymer and styrene-butadiene-butylene-styrene (SBBS) copolymer.

The commercially available styrene elastomers include, for example, "Tufprene™", "Asaprene™", "Tuftec™" and "S.O.E." produced by Asahi Kasei Corporation, "Elastomer AR" produced by Aronkasei Co., Ltd., "SEPTON" and "HYBRAR" produced by Kuraray Co., Ltd., "JSR TR" and "JSR SIS" produced by JSR Corporation, "MAXIRON" produced by Showa Kasei Kogyo Co., Ltd., "Tri-Blene" and "Super Tri-Blene" produced by Shinko Kasei Co., Ltd., "ESPOLEX SB Series" produced by Sumitomo Chemical Co., Ltd., and "Leostomer", "Actymer", "Hyper Alloy Actymer" and "Actymer G" produced by Riken Technos Corp.

The hard segment of the olefin elastomers includes, for example, a segment composed of polypropylene, propylene-ethylene copolymer or polyethylene. The soft segment of the elastomers includes, for example, a segment composed of polyethylene, a copolymer of ethylene and a trace amount of a diene (for example, ethylene-propylene copolymer (EPM), ethylene-propylene-diene copolymer (EPDM) and EPDM partially cross-linked by adding an organic peroxide).

The copolymers or the mixture of polymers for the olefin elastomer can be grafted with unsaturated hydroxy monomers and their derivatives, and with unsaturated carboxylic acid monomers and their derivatives.

The commercially available olefin elastomers include, for example, "Santoprene™" and "Vistamaxx™" produced by Exxon Mobil Corporation, "EXCELINK" produced by JSR Corporation, "MAXIRON" produced by Showa Kasei Kogyo Co., Ltd., "ESPOLEX TPE Series" produced by Sumitomo Chemical Co., Ltd., "ENGAGE" produced by The Dow Chemical Company, "Prime TPO" produced by Prime Polymer Co., Ltd., "MILASTOMER" produced by Mitsui Chemicals, Inc., "ZELAS™" and "THERMORUN™" produced by Mitsubishi Chemical Corporation, and "MULTIUSE LEOSTOMER", "ACTYMER" and "TRINITY" produced by Riken Technos Corp.

Of those base resins, at least one base resin selected from diene rubbers, polyethylene resins, polypropylene resins, urethane elastomers, olefin elastomers and styrene elastomers is preferable to stably prepare the resin composition. More preferable base resins include at least one selected from diene rubbers, ethylene-vinyl acetate copolymer, ethylene-methyl(meth)acrylate copolymer, ethylene-ethyl(meth)acrylate copolymer, ethylene-butyl(meth)acrylate copolymer, low density polyethylene (LDPE), linear low density polyethylene (L-LDPE), high density polyethylene (HDPE), polypropylene, polybutene, polyisobutylene, polymethylpentene, urethane elastomers, olefin elastomers and styrene elastomers. Yet further more preferable base resins include at least one selected from natural rubbers, butadiene rubber, styrene-butadiene rubber, acrylonitrile-butadiene rubber, ethylene-α-olefin-nonconjugated diene copolymer rubber, ethylene-vinyl acetate copolymer, ethylene-methyl(meth)acrylate copolymer, ethylene-ethyl(meth) acrylate copolymer, low density polyethylene (LDPE), linear low density polyethylene (L-LDPE), high density polyethylene (HDPE), polypropylene, olefin elastomers and styrene elastomers.

The base resin should preferably have a melting point or softening point not more than the expansion initiation temperature of the heat-expandable microspheres.

If the resin composition is a masterbatch, at least one base resin selected from diene rubbers, polyethylene resins, polypropylene resins, urethane elastomers, olefin elastomers and styrene elastomers among the base resins mentioned above is preferable to stably prepare the masterbatch. More preferable base resins include at least one selected from diene rubbers, ethylene-vinyl acetate copolymer, ethylene-methyl (meth)acrylate copolymer, ethylene-ethyl(meth)acrylate copolymer, ethylene-butyl(meth)acrylate copolymer, low density polyethylene (LDPE), polypropylene, olefin elastomers, urethane elastomers and styrene elastomers. Further more preferable base resin is at least one selected from natural rubbers, butadiene rubber, styrene-butadiene rubber, acrylonitrile-butadiene rubber, ethylene-α-olefin-nonconjugated diene copolymer rubber, ethylene-vinyl acetate copolymer, ethylene-methyl(meth)acrylate copolymer, ethylene-ethyl(meth)acrylate copolymer, low density polyethylene (LDPE), polypropylene, olefin elastomers and styrene elastomers.

When the resin composition is a masterbatch, a mixture containing the resin composition and a matrix resin is prepared and the mixture is manufactured into molded articles. The matrix resin used herein can be at least one selected from the base resins mentioned above.

The ethylene-α-olefin-unconjugated diene copolymer rubber is a random copolymer of ethylene, α-olefin and unconjugated diene. The α-olefin includes propylene, 1-butene, 1-penetene, 3-methyl-1-pentene, 4-methyl-1-pentene, 1-hexene, 1-heptene, 1-octene, 1-nonene, 1-decene, 1-undecene and 1-dodecene. Of those α-olefins, propylene, 1-hexene and 1-octene are preferable and propylene is more preferable. One of or a combination of at least two of the α-olefins can be used. The mole ratio of ethylene to α-olefin is not specifically restricted and should preferably range from 40:60 to 95:5, more preferably from 50:50 to 85:15 and further more preferably from 60:40 to 80:20. The unconjugated diene includes 1,4-hexadiene, 3-methyl-1,4-hexadiene, 1,7-octadiene, 1,9-decadiene, 5-ethylidene-2-norbornene, 5-isopropylidene-2-norbornene, 5-isobutenyl-2-norbornene, cyclopentadiene, dicyclopentadiene and norbornadiene. Of those unconjugated dienes, 5-ethylidene-2-norbornene and dicyclopentadiene are preferable. One of or a combination of at least two of the unconjugated dienes can be used.

If the base resin contains at least one resin selected from olefin resins and thermoplastic elastomers, the melting point or softening point of the at least one resin selected from olefin resins and thermoplastic elastomers preferably ranges from 55 to 200° C., more preferably from 65 to 180° C., further more preferably from 105 to 170° C. and most preferably from 110 to 160° C. to stably lighten the resin composition.

If the resin composition is a masterbatch and the base resin contains at least one resin selected from olefin resins and thermoplastic elastomers, the melting point or softening point of the olefin resins and thermoplastic elastomers is preferably lower than the expansion initiation temperature (Ts) of heat-expandable microspheres so as not to expand the heat-expandable microspheres during preparation of the masterbatch. The melting point or softening point of the base resin contained in a masterbatch is not specifically restricted, and preferably ranges from 40 to 100° C., more preferably from 50 to 90° C., further more preferably from 55 to 85° C. and yet further more preferably from 60 to 80° C.

If the base resin contains at least one resin selected from olefin resins and thermoplastic elastomers, the tensile stress at break of the olefin resins and thermoplastic elastomers is not specifically restricted to the extent that the tensile stress at break is sufficient to lighten the resultant molded articles and prevent the surface of the molded articles from peeling. The tensile stress at break is preferably not higher than 120 MPa, more preferably ranges from 2 to 80 MPa, further more preferably from 5 to 65 MPa and yet further more preferably from 5 to 50 MPa. The possible minimum of the tensile stress at break is 1 MPa.

If the base resin contains a rubber, the Mooney viscosity of the rubber is not specifically restricted in relation to lightening molded articles and preventing the surface of the molded articles from peeling. However, the Mooney viscosity ML (1+4) (hereinafter sometimes referred to as Mooney viscosity) of the rubber at 100° C. measured according to JIS K6300 preferably ranges from 5 to 120, more preferably from 10 to 105, further more preferably from 20 to 95, yet further more preferably from 30 to 85 and most preferably from 35 to 80 in order to lighten the resultant molded articles and prevent the surface of the molded articles from peeling.

The solubility parameter of the base resin is not specifically restricted in relation to preventing the surface of molded articles from peeling. However, the solubility parameter preferably ranges from 7 to 20 $(cal/cm^3)^{1/2}$, more preferably from 7.5 to 17 $(cal/cm^3)^{1/2}$ and further more preferably from 8 to 15 $(cal/cm^3)^{1/2}$. A solubility parameter of the base resin beyond the range mentioned above can cause poor compatibility of the base resin to heat-expandable microspheres and make the heat-expandable microspheres apt to aggregate near the surface of the molded articles. When the heat-expandable microspheres aggregating near the surface expand during molding, the strength of the portion near the surface of the molded articles decreases and results in a peeled surface of the molded articles due to the friction between the molded articles and the outlet port of the molding machine. This can impair the appearance of the molded articles, also make the molded articles brittle and cause breakage of the molded articles that inhibits stable manufacture of the molded articles.

Heat-Expandable Microspheres

Figure 3:
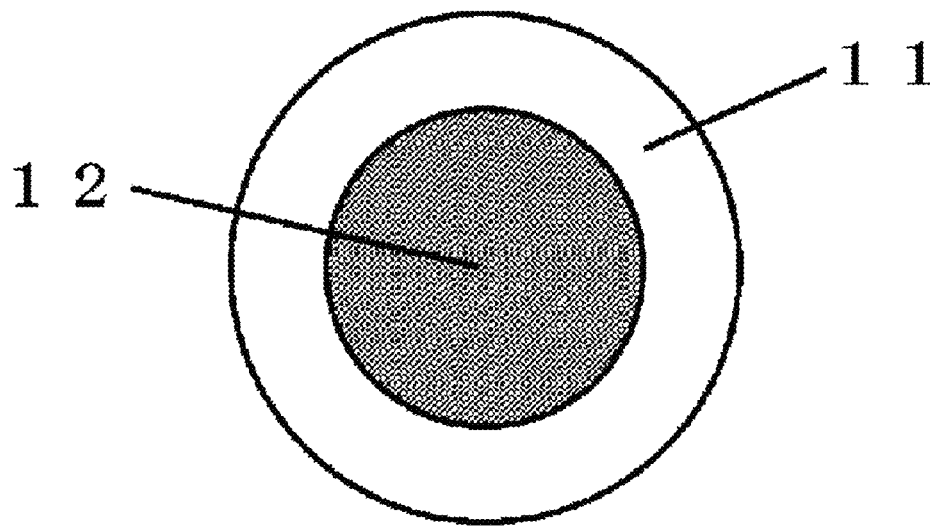
FIG. 3 is a schematic diagram of an example of the heat-expandable microspheres.

Heat-expandable microspheres are an essential constituent of the resin composition of the present invention. The heat-expandable microspheres comprise a shell 11 of a thermoplastic resin and a thermally vaporizable blowing agent (core) 12 encapsulated therein as shown in FIG. 3. The heat-expandable microspheres have a core shell structure, and the whole of a microsphere is thermally expandable (a microsphere wholly expandable by heating). The thermoplastic resin is obtained by polymerizing a polymerizable component. The thermoplastic resin is a polymer of the polymerizable component.

The polymerizable component is polymerized into a thermoplastic resin which constitutes the shell of the heat-expandable microspheres. The polymerizable component essentially contains a monomer component and can optionally contain a cross-linking agent. The monomer component means a radically-polymerizable monomer having a polymerizable double bond per molecule and can be addition-polymerized. The cross-linking agent means a radically-polymerizable monomer having at least two polymerizable double bonds per molecule and introduces bridged structure into the thermoplastic resin.

The polymerizable component contains N-substituted maleimide to attain the effect of the present invention. The N-substituted maleimide includes, for example, N-phenyl maleimide, N-cyclohexyl maleimide, N-benzyl maleimide, N-tert-butyl maleimide, N-ethyl maleimide, N-(2-hydroxyethyl) maleimide, N-methoxycarbonyl maleimide, N-methyl maleimide, N-(2-chlorophyll) maleimide and N-lauroyl maleimide.

Of those N-substituted maleimides, N-phenyl maleimide and N-cyclohexyl maleimide are preferable for improved heat resistance and expansion ratio of resultant heat-expandable microspheres.

One of or a combination of the N-substituted maleimides can be used.

The amount of the N-substituted maleimide in the polymerizable component is not specifically restricted and preferably ranges from 5 to 45 wt %. The upper limit of the amount of the N-substituted maleimide in the polymerizable component is preferably 40 wt %, more preferably 35 wt %, further more preferably 33 wt % and most preferably 30 wt %. On the other hand, the lower limit of the amount of the N-substituted maleimide is preferably 7 wt %, more preferably 9 wt %, further more preferably 11 wt % and most preferably 14 wt %. The amount of the N-substituted maleimide less than 5 wt % results in heat-expandable microspheres having poor heat resistance. The shell of such heat-expandable microspheres shrinks during molding and the encapsulated blowing agent vaporizes to escape out the heat-expandable microspheres leading to failure in manufacture lightweight molded articles. In addition, the blowing agent escaping out the microspheres makes pores near the surface of the molded articles to thereby decrease the strength of the portions near the surface of the molded articles. Such portions can result in the molded articles having a peeled surface due to the friction between the molded articles and the outlet port of the molding machine. In addition, such heat-expandable microspheres can expand during preparation of a masterbatch comprising the heat-expandable microspheres and a base resin and inhibit stable preparation of the masterbatch. On the other hand, the amount of the N-substituted maleimide higher than 45 wt % can cause poor expansion performance of the resultant heat-expandable microspheres that fail to lighten molded articles.

The polymerizable component also contains a nitrile monomer in order to attain a sufficient gas barrier property of heat-expandable microspheres. The nitrile monomer includes acrylonitrile, methacrylonitrile, α-chloroacrylonitrile, α-ethoxyacrylonitrile and fumaronitrile.

One of or a combination of the nitrile monomers can be used.

Figure 4:
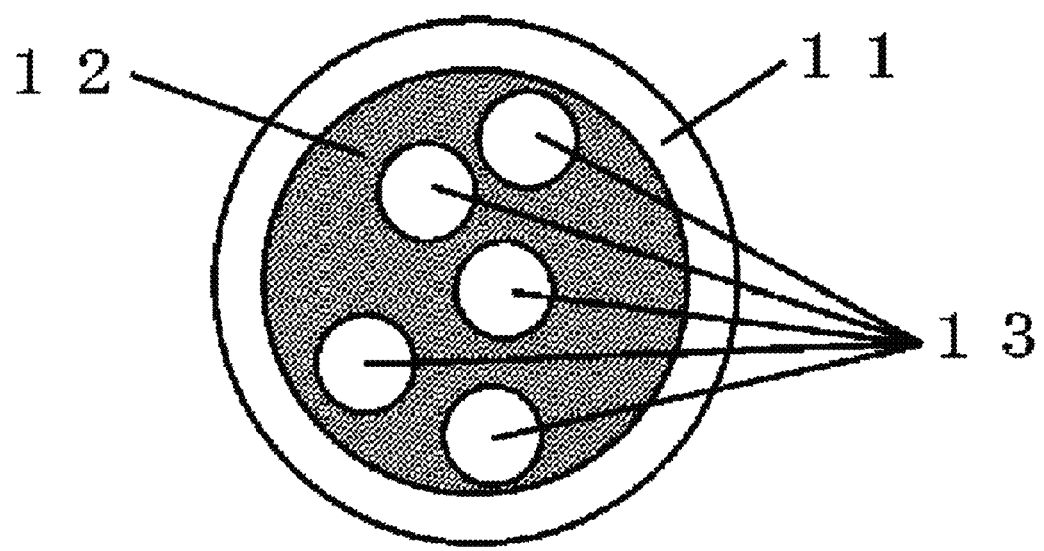
FIG. 4 is a schematic diagram of an example of the multinucleated heat-expandable microspheres.

In the polymerization of the polymerizable component, preferably all the polymerizable component polymerized into a thermoplastic resin constitutes the shell of the heat-expandable microspheres. However, a polymerizable component containing no methacrylonitrile (as a nitrile monomer) can generate fine particles of the thermoplastic resin inside the shell of the resultant heat-expandable microspheres (hereinafter the phenomenon is also referred to as the multinucleation of heat-expandable microspheres and heat-expandable microspheres with such phenomenon are also referred to as multinucleated microspheres). An example of the heat-expandable microspheres with the multinucleation is shown in FIG. 4.

The multinucleation is estimated to be caused by rapid polymerization of the polymerizable component due to lack of methacrylonitrile, because the rapid polymerization can shorten the time of the polymer of the polymerizable component being dissolved in remaining polymerizable component and in the blowing agent to be encapsulated and make the polymer deposit into resin particles 13 inside the heat-expandable microspheres before the polymer is formed into the thermoplastic resin constituting the shell of the heat-expandable microspheres.

The multinucleation of heat-expandable microspheres makes the shell of the heat-expandable microspheres thinner than the theoretically estimated thickness and can impair the heat resistance and expansion performance of the heat-expandable microspheres leading to failure in lightening molded articles. In addition, such multinucleated heat-expandable microspheres are estimated to cause peeled surface of the molded articles, because the shell of the heat-expandable microspheres shrinks during molding to make the encapsulated blowing agent vaporize and escape out the heat-expandable microspheres, the blowing agent escaping out the microspheres makes pores near the surface of the molded articles to decrease the strength of the portions near the surface of the molded articles and such portions can result in peeled surface of the molded articles due to the friction between the molded articles and the outlet port of the molding machine.

For preventing the multinucleation of the heat-expandable microspheres, the nitrile monomer essentially contains methacrylonitrile.

The amount of the nitrile monomer in the polymerizable component is not specifically restricted and is preferably higher than 50 wt %. The upper limit of the amount of the nitrile monomer in the polymerizable component is preferably 94 wt %, more preferably 90 wt %, further more preferably 87 wt % and yet further more preferably 84 wt %. On the other hand, the lower limit of the amount of the nitrile monomer is preferably 55 wt %, more preferably 60 wt %, further more preferably 64 wt % and most preferably 67 wt %.

The amount of methacrylonitrile in the nitrile monomer is not specifically restricted and preferably ranges from 5 to 60 wt %. The upper limit of the amount of the methacrylonitrile in the nitrile monomer is preferably 45 wt %, more preferably 32 wt %, further more preferably 29 wt % and most preferably 24 wt %. On the other hand, the lower limit of the amount of the methacrylonitrile in the nitrile monomer is preferably 7 wt %, more preferably 8 wt % and most preferably 9 wt %. The nitrile monomer containing less than 5 wt % of methacrylonitrile can result in the multinucleation of heat-expandable microspheres that impairs the heat resistance and expansion performance of the heat-expandable microspheres leading to failure in lightening molded articles. In addition, multinucleation causes the surface of the molded articles to peel. This is because the shell of the heat-expandable microspheres shrinks during molding to make the encapsulated blowing agent vaporize and escape out the heat-expandable microspheres, the blowing agent escaping out the microspheres makes pores near the surface of the molded articles to decrease the strength of the portions near the surface of the molded articles and such portions can result in a peeled surface of the molded articles due to the friction between the molded articles and the outlet port of the molding machine.

The amount of methacrylonitrile in the polymerizable component is not specifically restricted and preferably ranges from 3 to 40 wt %. The upper limit of the amount of the methacrylonitrile in the polymerizable component is preferably 35 wt %, more preferably 30 wt %, further more preferably 28 wt % and most preferably 24 wt %. On the other hand, the lower limit of the amount of the methacrylonitrile in the polymerizable component is preferably 5 wt %, more preferably 6 wt %, further more preferably 10 wt % and most preferably 12 wt %. The polymerizable component containing less than 3 wt % of methacrylonitrile can result in the multinucleation of heat-expandable microspheres that impairs the heat resistance and expansion performance of the heat-expandable microspheres leading to failure in lightening molded articles. In addition, multinucleation causes the surface of the molded articles to peel. This is because the shell of the heat-expandable microspheres shrinks during molding to make the encapsulated blowing agent vaporize and escape out the heat-expandable microspheres, the blowing agent escaping out the microspheres makes pores near the surface of the molded articles to decrease the strength of the portions near the surface of the molded articles and such portions can result in peeled surface of the molded articles due to the friction between the molded articles and the outlet port of the molding machine. On the other hand, the polymerizable component containing more than 40 wt % of methacrylonitrile can impair the expansion performance of the resultant heat-expandable microspheres to cause failure in lightening the molded articles.

The nitrile monomer containing acrylonitrile in addition to methacrylonitrile is preferable because such nitrile monomer attains further improved heat-resistance and expansion performance of the resultant heat-expandable microspheres and contributes to lightening the molded articles more effectively while preventing the surface of the molded articles from peeling.

The total amount of N-substituted maleimide and methacrylonitrile in the polymerizable component is not specifically restricted and preferably ranges from 8 to 60 wt % for attaining sufficient heat resistance of the resultant heat-expandable microspheres. The upper limit of the total amount of N-substituted maleimide and methacrylonitrile in the polymerizable component is preferably on the order of (1) 50 wt %, (2) 46 wt %, (3) 40 wt %, (4) 36 wt % and (5) 32 wt % (where a greater number indicates a more preferable amount). On the other hand, the lower limit of the total amount of N-substituted maleimide and methacrylonitrile in the polymerizable component is preferably on the order of (1) 10 wt %, (2) 15 wt %, (3) 18 wt %, (4) 20 wt % and (5) 21 wt % (where a greater number indicates a more preferable amount).

The polymerizable component containing less than 8 wt % of the total amount of N-substituted maleimide and methacrylonitrile can impair the heat resistance of the resultant heat-expandable microspheres to cause shrinkage of the shell of the heat-expandable microspheres during molding and make the encapsulated blowing agent vaporize and escape out of the heat-expandable microspheres. This can cause failure in lightening the molded articles and also cause the surface of the molded articles to peel. This is because the blowing agent escaping out the microspheres makes pores near the surface of the molded articles to thereby decrease the strength of the portions near the surface of the molded articles, and such portions can result in molded articles having a peeled surface due to the friction between the molded articles and the outlet port of the molding machine. On the other hand, the polymerizable component containing more than 60 wt % of the total amount of N-substituted maleimide and methacrylonitrile can impair the expansion performance of the resultant heat-expandable microspheres to cause failure in lightening molded articles.

The polymerizable component contains N-substituted maleimide and the nitrile monomer essentially containing methacrylonitrile and satisfies the condition 1 described below in order to attain the effect of the present invention. The polymerizable component satisfying the condition 1 prevents multinucleation of the resultant heat-expandable microspheres and attains sufficient expansion performance and heat resistance of the resultant heat-expandable microspheres while preventing the surface of molded articles from peeling.

Condition 1: The amounts of the N-substituted maleimide and methacrylonitrile in the polymerizable component are represented by the following formula (I):

Amount of N-substituted maleimide/amount of methacrylonitrile≥0.33    Formula (I)

The value of Formula (I) is preferably at least 0.33. The upper limit of the value of Formula (I) is preferably on the order of (1) 7, (2) 6.69, (3) 5.0, (4) 4.0, (5) 3.67 and (6) 3.0 (where a greater number indicates a more preferable value). On the other hand, the lower limit of the value of Formula (I) is preferably on the order of (1) 0.35, (2) 0.5, (3) 0.7 and (4) 0.8 (where a greater number indicates more preferable value).

A value of Formula (I) smaller than 0.33 can impair the heat resistance of the resultant heat-expandable microspheres to cause shrinkage of the shell of the resultant heat-expandable microspheres during molding and make the encapsulated blowing agent vaporize and escape out of the heat-expandable microspheres. This can cause failure in lightening the molded articles and also cause the surface of the molded articles to peel. This is because the blowing agent escaping out the microspheres makes pores near the surface of the molded articles to thereby decrease the strength of the portions near the surface of the molded articles, and such portions can result in molded articles having a peeled surface due to the friction between the molded articles and the outlet port of the molding machine.

The polymerizable component can further contain a (meth)acrylate ester monomer for easily adjusting the expansion behavior of the heat-expandable microspheres. The (meth)acyl mentioned in the present invention means acryl and methacryl.

The (meth)acrylate ester monomer is not specifically restricted and includes methyl (meth)acrylate, ethyl (meth)acrylate, n-butyl (meth)acrylate, isobutyl (meth)acrylate, t-butyl (meth)acrylate, 2-ethylhexyl (meth)acrylate, stearyl (meth)acrylate, lauryl (meth)acrylate, phenyl (meth)acrylate, isobornyl (meth)acrylate, cyclohexyl (meth)acrylate and benzyl (meth)acrylate.

The amount of (meth)acrylate ester in the polymerizable component is not specifically restricted and is preferably less than 40 wt %, more preferably range from 0 to 0.20 wt %, further more preferably from 0.5 to 15 wt % and yet further more preferably from 0.8 to 7 wt %. The polymerizable component containing 40 wt % or more of (meth)acrylate ester can impair the heat resistance and gas barrier property of the resultant heat-expandable microspheres to cause shrinkage of the shell of the resultant heat-expandable microspheres during molding and make the encapsulated blowing agent vaporize and escape out the heat-expandable microspheres. This can cause failure in lightening the molded articles and also peeled surface of the molded articles, because the blowing agent escaping out the microspheres makes pores near the surface of the molded articles to decrease the strength of the portions near the surface of the molded articles and such portions can result in the molded articles having a peeled surface due to the friction between the molded articles and the outlet port of the molding machine.

The polymerizable component can contain monomers other than the N-substituted maleimide, nitrile monomers and (meth)acrylate ester monomers to the extent that the monomers do not adversely affect the effect of the present invention. Such monomers include halogen-containing monomers, (meth)acrylate amide monomers, styrene monomers; vinyl ester monomers such as vinyl acetate, vinyl propionate and vinyl butyrate; ethylenically unsaturated monoolefin monomers such as ethylene, propylene and isobutylene; vinyl ether monomers such as vinyl methyl ether, vinyl ethyl ether and vinyl isobutyl ether; vinyl ketone monomers such as vinyl methyl ketone; N-vinyl monomers such as N-vinyl carbazole and N-vinyl pyrrolidone; vinyl naphthalene salt, N-methylol (meth)acryl amide, N,N-dimethylaminoethyl (meth)acrylate, N,N-dimethylaminopropyl (meth)acrylate, vinyl glycidyl ether, propenyl glycidyl ether, glycidyl (meth)acrylate, glycerin mono(meth)acrylate, 4-hydroxybutyl acrylate glycidyl ether, 2-hydroxyethyl (meth)acrylate, 2-hydroxypropyl (meth)acrylate, 2-hydroxybutyl (meth)acrylate, 4-hydroxybutyl (meth)acrylate, 2-hydroxy-3-phenoxypropyl (meth)acrylate and p-hydroxy styrene.

The halogen-containing monomers are not specifically restricted and include vinyl chloride and vinylidene chloride.

The (meth)acrylate amide monomers are not specifically restricted and include acrylamide, substituted acrylamide, methacrylamide and substituted methacrylamide.

The styrene monomers are not specifically restricted and include styrene, α-methylstyrene, vinyltoluene, t-butylstyrene, p-nitrostyrene and chloromethylstyrene.

It is preferable that the polymerizable component does not substantially contain carboxyl-group-containing monomers. The carboxyl-group-containing monomers include, for example, acrylic acid, methacrylic acid, crotonic acid, maleic acid and itaconic acid. Although the polymerizable component containing carboxyl-group-containing monomers contributes to effectively improved heat resistance of the resultant heat-expandable microsphere, such polymerizable component causes poor compatibility of the resultant heat-expandable microspheres to the base resin that makes the heat-expandable microspheres apt to aggregate near the surface of molded articles. Thus, the strength of the portions near the surface of the molded articles decreases when the heat-expandable microspheres expand during molding, and the surface of the molded article can become peeled due to the friction between the molded articles and the outlet port of the molding machine. Such molded articles can have poor appearance and become fragile due to the peeled surface to possibly break during molding and inhibit stable manufacture of molded articles.

The expression, "does not substantially contain carboxyl-group-containing monomers", means that the amount of carboxyl-group-containing monomers in the polymerizable component is preferably not greater than 5 wt %, more preferably not greater than 3 wt %, further more preferably not greater than 1 wt %, yet more preferably not greater than 0.3 wt %, yet further more preferably less than 0.1 wt % and most preferably 0 wt %.

The polymerizable component can contain a cross-linking agent as mentioned above. Polymerization with the cross-linking agent minimizes the decrease of the retention ratio (encapsulation ratio) of the encapsulated blowing agent during thermal expansion of the resultant heat-expandable microspheres to attain effective thermal expansion of the microspheres and minimizes peeled surface of the molded articles.

The cross-linking agent is not specifically restricted, and includes, for example, aromatic divinyl compounds, such as divinylbenzene; and polyfunctional (meth)acrylate compounds, such as allyl methacrylate, triacrylformal, triallyl isocyanate, ethylene glycol di(meth)acrylate, diethylene glycol di(meth)acrylate, triethylene glycol di(meth)acrylate, neopentylglycol di(meth)acrylate, polytetramethyleneglycol di(meth)acrylate, 1,4-butanediol di(meth)acrylate, 1,6-hexanediol di(meth)acrylate, 1,9-nonanediol di(meth)acrylate, PEG (200) di(meth)acrylate, PEG (400) di(meth)acrylate, PEG (600) di(meth)acrylate, trimethylolpropane tri(meth)acrylate, pentaerythritol tri(meth)acrylate, pentaerythritol tetraacrylate, dipentaerythritol hexaacrylate, 2-butyl-2-ethyl-1,3-propanediol diacrylate and tricyclodecane di(meth)acrylate. Of those compounds, polyfunctional acrylate compounds having at least two acrylate groups per molecule is preferable to improve the expansion performance and heat resistance of the resultant heat-expandable microspheres. One of or a combination of at least two of those cross-linking agents can be used.

The molecular weight of the cross-linking agent is not specifically restricted and preferably ranges from 140 to 35000, more preferably from 200 to 25000, further more preferably from 250 to 10000, yet further more preferably from 298 to 5000 and most preferably from 300 to 3500. A cross-linking agent having a molecular weight not greater than 35000 can result in improved retention of the blowing agent encapsulated in the resultant heat-expandable microspheres in thermal expansion of the microspheres to improve the expansion performance of the microspheres. A cross-linking agent having a molecular weight a least 140 can improve the heat resistance of the resultant heat-expandable microspheres.

Although the cross-linking agent can not be used, the amount of the cross-linking agent is not specifically restricted and preferably ranges from 0 to 4.0 parts by weight to 100 parts by weight of the monomer component, more preferably from 0.02 to 2 parts by weight and further more preferably from 0.05 to 1.5 parts by weight. The amount of the cross-linking agent higher than 4.0 parts by weight can impair the expansion performance of the resultant heat-expandable microspheres and cause failure in lightening the molded articles.

The blowing agent vaporizes by heating and the blowing agent encapsulated in the thermoplastic resin shell of heat-expandable microspheres makes the whole of a microsphere thermally expandable (a microsphere wholly expandable by heating).

The blowing agent is not specifically restricted and includes, for example, $C_3$-$C_{13}$ hydrocarbons such as propane, (iso)butane, (iso)pentane, (iso)hexane, (iso)heptane, (iso)octane, (iso)nonane, (iso)decane, (iso)undecane, (iso)dodecane and (iso)tridecane; hydrocarbons having a carbon number greater than 13 and not greater than 20, such as (iso)hexadecane and (iso)eicosane; hydrocarbons from petroleum fractions such as pseudocumene, petroleum ether, and normal paraffins and isoparaffins having an initial boiling point ranging from 150 to 260° C. and/or being distilled at a temperature ranging from 70 to 360° C.; their halides; fluorine-containing compounds, such as hydrofluoroether; tetraalkyl silane; and compounds which thermally decompose to generate gases. One of or a combination of at least two of those blowing agents can be employed. The blowing agents can be any of linear, branched or alicyclic compounds, and preferably are aliphatic compounds.

The blowing agent is thermally vaporizable and preferably has a boiling point not higher than the softening point of the thermoplastic resin shell. This is because such blowing agent encapsulated in heat-expandable microspheres can generate sufficient vapor pressure at the expansion temperature of the heat-expandable microspheres to attain high expansion ratio of the microspheres. In addition, another blowing agent having a boiling point higher than the softening point of the thermoplastic resin shell can be encapsulated along with the blowing agent having a boiling point not higher than the softening point of the thermoplastic resin shell.

If a blowing agent having a boiling point higher than the softening point of the thermoplastic resin shell is encapsulated in heat-expandable microspheres, the amount of the blowing agent having a boiling point higher than the softening point of the thermoplastic resin shell in the whole of encapsulated blowing agent is preferably not greater than 95 wt %, more preferably not greater than 80 wt %, further more preferably not greater than 70 wt %, yet more preferably not greater than 65 wt %, yet further more preferably not greater than 50 wt % and most preferably less than 30 wt %. Although the amount of the blowing agent higher than 95 wt % leads to increased maximum expansion temperature ($T_{max}$) of heat-expandable microspheres, it results in low expansion ratio of the heat-expandable microspheres and failure in lightening molded articles.

In another concept for the blowing agent, at least one hydrocarbon (hereinafter referred to as the hydrocarbon (a)) selected from hydrocarbons having 8 or less carbon atoms can be an essential ingredient or a hydrocarbon having 8 carbon atoms can be an essential ingredient of the blowing agent. A blowing agent containing the hydrocarbon having 8 carbon atoms is preferable to improve the expansion performance and heat resistance of the resultant heat-expandable microspheres.

The carbon number of the hydrocarbon (a) preferably ranges from 4 to 8, more preferably from 5 to 8, and further more preferably be 8. The hydrocarbon (a) can be any of linear, branched or alicyclic compounds, and should preferably be aliphatic compounds. The hydrocarbon (a) includes, for example, (iso)butane, (iso)pentane, (iso)hexane, (iso)heptane and (iso)octane. One of or a combination of at least two of the hydrocarbons (a) can be used.

A blowing agent containing at least two hydrocarbons (a) is preferable for attaining sufficient expansion ratio of resultant heat-expandable microspheres.

The blowing agent preferably contains at least one hydrocarbon (hereinafter referred to as the hydrocarbon (b)) selected from hydrocarbons having at least 9 carbon atoms in addition to the hydrocarbon (a) in order to control the expansion of heat-expandable microspheres during molding or preparation of a masterbatch and efficiently lighten molded articles.

The carbon number of the hydrocarbon (b) is preferably at least 10, more preferably at least 12, further more preferably at least 14 and yet further more preferably at least 16. The upper limit of the carbon number of the hydrocarbon (b) is preferably 25. The hydrocarbon (b) can be any of linear, branched or alicyclic compounds, and should preferably be aliphatic compounds. The hydrocarbon (b) includes, for example, linear hydrocarbons such as nonane, isononane, decane, isodecane, dodecane, tridecane, tetradecane, pentadecane, hexadecane, heptadecane, octadecane, nonadecane, eicosane, heneicosane, docosane, tricosane, tetracosane and pentacosane; branched hydrocarbons, such as isododecane, 3-methyl undecane, isotridecane, 4-methyl dodecane, isotetradecane, isopendadecane, isohexadecane, 2,2,4,4,6,8,8-heptamethylnonane, isoheptadecane, isooctadecane, isononadecane, 2,6,10,14-tetramethyl pentadecane, isoeicosane, 2,2,4,4,6,6,8,8,10-nonamethylundecane, isoheneicosane, isodocosane, isotricosane, isotetracosane and isopentacosane; alicyclic hydrocarbons, such as cyclododecane, cyclotridecane, hexylcyclohexane, heptylcyclohaxane, n-octylcyclohexane, cyclopentadecane, nonylcyclohexane, decylcyclorhexane, pentadecylcyclohexane, hexadecylcyclohexane, heptadecylcyclohexane and octadecylcyclohexane. One of or a combination of at least two of the hydrocarbons (b) can be used.

The amount of the hydrocarbon (a) in the blowing agent is not specifically restricted and is preferably at least 50 wt % of the blowing agent, more preferably at least 60 wt %, further more preferably at least 75 wt %, yet further more preferably at least 85 wt % and most preferably at least 90 wt %. The upper limit of the hydrocarbon (a) in the blowing agent is 100 wt %.

A blowing agent containing less than 50 wt % of the hydrocarbon (a) can cause low expansion ratio of the resultant heat-expandable microspheres that can fail to lighten molded articles.

If the hydrocarbon (a) contains one of or a combination of at least two hydrocarbons, the weight ratio between at least one hydrocarbon (a-1) selected from the hydrocarbons having 4 to 7 carbon atoms and the hydrocarbon (a-2) having 8 carbon atoms, (a-1):(a-2), is not specifically restricted and preferably ranges from 80:20 to 0:100, more preferably from 70:30 to 20:80, further more preferably from 60:40 to 30:70 and most preferably from 55:45 to 40:60 to improve the expansion performance and heat resistance of the heat-expandable microspheres. The at least one hydrocarbon (a-1) selected from the hydrocarbons having 4 to 7 carbon atoms is at least one hydrocarbon selected from hydrocarbons having 4, 5, 6 or 7 carbon atoms and the hydrocarbon (a-2) having 8 carbon atoms is at least one hydrocarbon selected from hydrocarbons having 8 carbon atoms.

If the ratio, (a-1):(a-2), is beyond the range mentioned above, the resultant heat-expandable microspheres expand excessively during molding to make the shell of the microspheres thinner than desired thickness. Such expanded microspheres cannot endure the external pressure during molding to shrink or crush. The shrinkage or crush of the heat-expandable microspheres hinders the manufacture of lightweight molded articles and makes the encapsulated blowing agent vaporize and escape out the heat-expandable microspheres. The blowing agent escaping out the heat-expandable microspheres makes pores near the surface of molded articles to thereby decrease the strength of the portions near the surface of the molded articles, and the surface of the molded articles can peel due to the friction between the molded articles and the outlet port of the molding machine. In addition, the heat-expandable microspheres can expand during preparation of a masterbatch to inhibit stable preparation of the masterbatch.

The amount of the hydrocarbon (b) in the blowing agent is not specifically restricted and is preferably not greater than 50 wt %, more preferably not greater than 40 wt %, further more preferably not greater than 30 wt %, yet further more preferably not greater than 20 wt % and most preferably not greater than 10 wt %. The lower limit of the amount of the hydrocarbon (b) is 0 wt %. Although a blowing agent containing more than 50 wt % of the hydrocarbon (b) improves the heat resistance of the resultant heat-expandable microspheres, the expansion performance of the microspheres can be impaired to fail to lighten molded articles.

A blowing agent containing at least one hydrocarbon (a-1) selected from hydrocarbons having 4 to 7 carbon atoms, the hydrocarbon (a-2) having 8 carbon atoms and at least one hydrocarbon (b) selected from hydrocarbons having 9 or more carbon atoms can attain both sufficient heat resistance and expansion performance of the resultant heat-expandable microspheres. Such heat-expandable microspheres are preferable. This is because the expansion of such microspheres can be controlled during preparation of a masterbatch or molding, peeling of the surface of molded articles during molding is prevented, and lightweight molded articles having high expansion ratio can be manufactured.

The encapsulation ratio of the blowing agent encapsulated in heat-expandable microspheres is not specifically restricted and preferably ranges from 1 to 45 wt %, more preferably from 3 to 35 wt %, further more preferably from 5 to 30 wt % and yet further more preferably from 8 to 25 wt % of the heat-expandable microspheres. An encapsulation ratio lower than 1 wt % can result in poor effect of the blowing agent. On the other hand, an encapsulation ratio higher than 45 wt % can result in excessively thin shell of the heat-expandable microspheres to decease the heat resistance of the microspheres and make the blowing agent vaporize and escape out the microspheres. The blowing agent escaping out the microspheres can make pores near the surface of the molded articles to thereby decrease the strength of the portions near the surface, and cause the surface of the molded articles to peel due to the friction between the molded articles and the outlet of the molding machine.

The mean particle size of the heat-expandable microspheres is not specifically restricted and preferably ranges from 1 to 100 µm, more preferably from 2 to 70 µm, further more preferably from 3 to 50 µm, yet further more preferably from 7 to 40 µm and most preferably from 10 to 35 µm. Heat-expandable microspheres having a particle size smaller than 1 µm can have poor expansion performance. On the other hand, heat-expandable microspheres having a particle size greater than 100 µm can result in a rough surface of molded articles due to expanded microspheres. The portions near the surface of such molded articles have poor strength and can cause the surface of the molded articles to peel due to the friction between the molded articles and the outlet port of the molding machine. The procedure for measuring the mean particle size of the heat-expandable microspheres is described in the Examples.

The coefficient of variation, CV, of the particle size distribution of the heat-expandable microspheres is not specifically restricted, and is preferably not greater than 50%, more preferably not greater than 45%, and further more preferably not greater than 40%. The CV can be calculated by the following formula (1) and (2).

[Formulae 1]

$$CV = (s/\langle x \rangle) \times 100\,(\%) \quad (1)$$

$$s = \left\{ \sum_{i=1}^{n} (xi - \langle x \rangle)^2 / (n-1) \right\}^{1/2} \quad (2)$$

(where s is a standard deviation of the particle size of the microspheres, $\langle x \rangle$ is a mean particle size of the microspheres, "xi" is the particle size of the i-th particle, and n represents the number of particles)

The maximum expansion ratio of the heat-expandable microspheres is not specifically restricted and is preferably on the order of (1) not smaller than 15 times, (2) not smaller than 25 times, (3) not smaller than 40 times, (4) not smaller than 50 times, (5) not smaller than 60 times and (6) not smaller than 70 times (where greater number indicates more preferable expansion ratio). On the other hand, the upper limit of the expansion ratio is 250 times. Heat-expandable microspheres having a maximum expansion ratio less than 15 times can fail to sufficiently lighten molded articles. On the other hand, heat-expandable microspheres having a maximum expansion ratio greater than 250 times can cause the molded articles to have a rough surface due to expanded microspheres. The portions near the surface of such molded articles have poor strength and can result in a peeled surface due to the friction between the molded articles and the outlet port of the molding machine. The procedure for measuring the maximum expansion ratio of heat-expandable microspheres is described in the Examples.

The expansion initiation temperature (Ts) of the heat-expandable microspheres is not specifically restricted to the extent that the temperature is higher than the melting point or softening point of the base resin, and is preferably not lower than 135° C., more preferably not lower than 140° C., further more preferably not lower than 150° C., yet further more preferably not lower than 160° C. and most preferably not lower than 165° C. On the other hand, the upper limit of the expansion initiation temperature is preferably 190° C.

The maximum expansion temperature ($T_{max}$) of the heat-expandable microspheres is not specifically restricted, and preferably ranges from 173 to 240° C., more preferably from 175 to 210° C., further more preferably from 180 to 205° C. and yet further more preferably from 180 to 200° C. Heat-expandable microspheres having a maximum expansion temperature lower than 173° C. can not have sufficient heat resistance and the shell of such heat-expandable microspheres shrinks and the encapsulated blowing agent vaporize to escape out the heat-expandable microspheres. Such heat-expandable microspheres fail to manufacture lightweight molded articles and the blowing agent escaping out the microspheres makes pores near the surface of the molded articles to thereby decrease the strength of the portions near the surface of the molded articles. Such portions can cause the surface of the molded articles to peel due to the friction between the molded articles and the outlet port of the molding machine. On the other hand, heat-expandable microspheres having a maximum expansion temperature higher than 240° C. can have excessively high heat resistance to expand insufficiently in molding and fail to lighten the molded articles.

The procedure for measuring the expansion initiation temperature and maximum expansion temperature of heat-expandable microspheres is described in the Examples.

Production of Heat-Expandable Microspheres

The process for producing heat-expandable microspheres includes the step of polymerizing the polymerizable component mentioned above (hereinafter referred to as polymerization step) in an aqueous dispersion medium in which an oily mixture containing the polymerizable component and blowing agent mentioned above are dispersed.

The polymerizable component in the oily mixture should preferably be polymerized in the presence of a polymerization initiator.

The polymerization initiator is not specifically restricted, and includes peroxides and azo compounds.

The peroxides include, for example, peroxidicarbonates, such as diisopropyl peroxydicarbonate, di-sec-butyl peroxydicarbonate, di-2-ethylhexyl peroxydicarbonate and dibenzyl peroxydicarbonate; diacyl peroxides, such as lauroyl peroxide and benzoyl peroxide; ketone peroxides, such as methyl ethyl ketone peroxide and cyclohexanone peroxide; peroxy ketals, such as 2,2-bis(t-butylperoxy) butane; hydroperoxides, such as cumene hydroperoxide and t-butyl hydroperoxide; dialkyl peroxides, such as dicumyl peroxide and di-t-butyl peroxide; and peroxyesters, such as t-hexyl peroxypivalate and t-butyl peroxyisobutyrate.

The azo compound includes, for example, 2,2'-azobis(4-methoxy-2,4-dimethyl valeronitrile), 2,2'-azobisisobutyronitrile, 2,2'-azobis(2,4-dimethyl valeronitrile), 2,2'-azobis(2-methyl propionate), 2,2'-azobis(2-methyl butylonitrile) and 1,1'-azobis(cyclohexane-1-carbonitrile). One of or a combination of at least two of the polymerization initiators can be employed. The polymerization initiator is preferably an oil-soluble polymerization initiator which is soluble in the monomer component.

The amount of the polymerization initiator preferably ranges from 0.05 to 10 wt %, more preferably from 0.1 to 8 wt % and most preferably from 0.2 to 5 wt % of 100 parts by weight of the polymerizable component. The amount less than 0.05 wt % can result in incomplete polymerization of the polymerizable component and decreased retention of a blowing agent in microspheres. Thus, the blowing agent vaporizes and escapes out the resultant heat-expandable microspheres to cause failure in lightening molded articles and make pores near the surface of the molded articles. The strength of the portions near the surface of the molded articles thus decreases, and the surface of the molded articles can peel due to the friction between the molded articles and the outlet port of the molding machine. The amount higher than 10 wt % can result in poor heat resistance and expansion performance of the heat-expandable microspheres to fail to lighten molded articles.

The process for producing heat-expandable microspheres contains the steps of preparing an aqueous suspension by dispersing an oily mixture in an aqueous dispersion medium and polymerizing the polymerizable component.

The aqueous dispersion medium contains water, such as deionized water, as the main component, and the oily mixture is dispersed therein. The aqueous dispersion medium can further contain alcohols, such as methanol, ethanol and propanol, and hydrophilic organic solvents, such as acetone. The hydrophilic property mentioned in the present invention means the property of a substance optionally miscible in water. The amount of the aqueous dispersion medium used in the process is not specifically restricted, and preferably ranges from 100 to 1000 parts by weight to 100 parts by weight of the polymerizable component.

The aqueous dispersion medium can further contain an electrolyte, such as sodium chloride, magnesium chloride, calcium chloride, sodium sulfate, magnesium sulfate, ammonium sulfate and sodium hydroxide. One of or a combination of at least two of these electrolytes can be used. The amount of the electrolyte is not specifically restricted, and preferably ranges from 0.1 to 50 parts by weight to 100 parts by weight of the aqueous dispersion medium.

The aqueous dispersion medium can contain at least one water-soluble compound selected from the group consisting of water-soluble 1,1-substitution compounds having a carbon atom bonded with a hetero atom and with a hydrophilic functional group selected from the group consisting of hydroxyl group, carboxylic acid (salt) groups and phosphonic acid (salt) groups, potassium dichromate, alkali metal nitrite salts, metal (III) halides, boric acid, water-soluble ascorbic acids, water-soluble polyphenols, water-soluble vitamin Bs, and water-soluble phosphonic acids and phosphonate salts. The term "water-soluble" in the present invention means that at least 1 g a substance is soluble in 100 g of water.

The amount of the water-soluble compound contained in the aqueous dispersion medium is not specifically restricted, and preferably ranges from 0.0001 to 1.0 part by weight to 100 parts by weight of the polymerizable component, more preferably from 0.0003 to 0.1 parts by weight, and most preferably from 0.001 to 0.05 parts by weight. An insufficient amount of the water-soluble compound can fail to exert sufficient effect by the water-soluble compound. On the other hand, an excessive amount of the water-soluble compound can decrease the polymerization rate or increase the amount of the residue from the polymerizable component which is the raw material of the microspheres.

The aqueous dispersion medium can contain a dispersion stabilizer or dispersion stabilizing auxiliary in addition to the electrolytes and water-soluble compounds.

The dispersion stabilizer is not specifically restricted, and includes, for example, calcium triphosphate, magnesium pyrophosphate and calcium pyrophosphate produced by double reaction, colloidal silica, alumina sol and magnesium hydroxide. One of or a combination of at least two of those dispersion stabilizers can be used.

The amount of the dispersion stabilizer preferably ranges from 0.1 to 30 parts by weight to 100 parts by weight of the polymerizable component and more preferably from 0.5 to 20 parts by weight.

The dispersion stabilizing auxiliary is not specifically restricted, and includes, for example, polymeric dispersion stabilizing auxiliaries, and surfactants, such as cationic surfactants, anionic surfactants, amphoteric surfactants and nonionic surfactants. One of or a combination of at least two of those dispersion stabilizing auxiliaries can be used.

The aqueous dispersion medium is prepared, for example, by blending water-soluble compounds and optionally dispersion stabilizers and/or dispersion stabilizing auxiliaries with water (deionized water). The pH of the aqueous dispersion medium for polymerization is adjusted according to the water-soluble compounds, dispersion stabilizers and dispersion stabilizing auxiliaries.

The polymerization for producing heat-expandable microspheres can be conducted in the presence of sodium hydroxide or the combination of sodium hydroxide and zinc chloride.

In the production process of the present invention, the oily mixture is dispersed and suspended in the aqueous dispersion medium to be formed into oil globules of a prescribed particle size.

The methods for dispersing and suspending the oily mixture include generally known dispersion methods, such as agitation with a Homo-mixer (for example, a device manufactured by Primix Corporation), dispersion with a static dispersing apparatus such as a Static mixer (for example, a device manufactured by Noritake Engineering Co., Ltd.), membrane emulsification technique and ultrasonic dispersion.

Then suspension polymerization is started by heating the dispersion in which the oily mixture is dispersed into oil globules in the aqueous dispersion medium. During the polymerization reaction, the dispersion should preferably be agitated gently to prevent the floating of monomers and sedimentation of polymerized heat-expandable microspheres.

The polymerization temperature can be settled optionally depending on the variant of the polymerization initiator, and is preferably controlled within the range from 30 to 100° C. and more preferably from 40 to 90° C. The polymerization temperature is preferably maintained for about 1 to 20 hours. The initial pressure for the polymerization is not specifically restricted, and is preferably controlled within the range from 0 to 5 MPa in gauge pressure and more preferably from 0.1 to 3 MPa.

After the polymerization, a metal salt can be added to the slurry (a suspension of heat-expandable microspheres) to create ionic crosslinks between the metal salt and the carboxyl groups, or the heat-expandable microspheres can be surface-treated with a metal-containing organic compound.

The preferable metal salt includes a salt of a polyvalent metallic cation, for example, Al, Ca, Mg, Fe, Ti and Cu. A water-soluble metal salt is preferable for easy addition, though a water-insoluble metal salt can be used. The metal-containing organic compound should preferably be water-soluble for efficient surface treatment and an organic compound containing a metal in the third to twelfth periods of the periodic table is preferable for improved heat resistance of the heat-expandable microspheres.

The resultant slurry is filtered with a centrifugal separator, press filter or suction extractor to be processed into a cake with a water content ranging from 10 to 50 wt %, preferably from 15 to 45 wt % and more preferably from 20 to 40 wt %. The cake is dried in a tray drier, indirect heating oven, fluidized bed dryer, vacuum dryer, vibration dryer or flash dryer to decrease the moisture content not greater than 6 wt % and preferably not greater than 3 wt %.

The cake can be washed with water and/or redispersed in water and then filtered again before the drying step for the purpose of decreasing the content of the ionic substances. The slurry can also be dried with a spray dryer or fluidized bed dryer to be processed into dry powder.

It is preferable that the heat-expandable microspheres contain lower ratio of multinucleated microspheres having at least one resin particle, inside their shell. For inspecting the percentage of such microspheres containing resin particles therein, heat-expandable microspheres having a mean particle size ranging from 1 to 100 µm (preferably ranging from 2 to 70 µm, more preferably from 3 to 50 µm, further more preferably from 7 to 40 µm and most preferably from 10 to 35 µm) can be classified by sifting through several sieves (of openings of 25 µm, 32 µm, 38 µm, 45 µm, 53 µm) and measuring the percentage of the multinucleated microspheres of each fraction of the classified microspheres as described in detail in the Examples.

When the percentage of the number of multinucleated microspheres in each fraction of the classified microspheres is measured and evaluated according to the criteria, A for 0 to 10%, B for more than 10% to 30%, C for more than 30% to 70%, D for more than 70% to 80% and E for more than 90% to 100%, the classified heat-expandable microspheres preferably simultaneously satisfy the following properties from (a) to (e).
  (a) The heat-expandable microspheres with the particle size ranging from 45 to 53 µm (in other words, the microspheres having passed 53 µm sieve opening and not having passed 45 µm sieve opening) are evaluated as A, B or C (preferably A or B and more preferably A).
  (b) The heat-expandable microspheres with the particle size ranging from 38 to 45 µm (in other words, the microspheres having passed 45 µm sieve opening and not having passed 38 µm sieve opening) are evaluated as A, B or C (preferably A or B and more preferably A).
  (c) The heat-expandable microspheres with the particle size ranging from 32 to 38 µm (in other words, the microspheres having passed 38 µm sieve opening and not having passed 32 µm sieve opening) are evaluated as A or B (preferably A).
  (d) The heat-expandable microspheres with the particle size ranging from 25 to 32 µm (in other words, the microspheres having passed 32 µm sieve opening and not having passed 25 µm sieve opening) are evaluated as A or B (preferably A).
  (e) The heat-expandable microspheres with the particle size smaller than 25 µm (in other words, the microspheres having passed 25 µm sieve opening) are evaluated as A.

The procedure for measuring the percentage of the number of multinucleated microspheres of the classified microspheres is described in Example.

The preferable heat-expandable microspheres according to the criteria mentioned above contain smaller percentage of multinucleated microspheres and most of the thermoplastic resin constitutes the shell of the heat-expandable microspheres as intended. Thus, the shell of the resultant microspheres is not much thinner than the theoretically estimated thickness and the microspheres have high heat resistance and expansion performance.

When almost no heat-expandable microspheres remain on a sieve, it is evaluated as though all the microspheres have passed the sieve.

The heat-expandable microspheres of the present invention have a shell of a polymerized composition containing N-substituted maleimide and nitrile monomer essentially containing methacrylonitrile. The shell has high heat resistance and retains the encapsulated blowing agent to control the shrinkage of the heat-expandable microspheres. The heat-expandable microspheres used as an ingredient of a resin composition comprising at least one selected from rubbers, olefin resins and thermoplastic elastomers contribute to the preparation or manufacture of a resin composition or molded articles with minimum or no peeled surface and good appearance that were not attained by conventional heat-expandable microspheres. In addition, such heat-expandable microspheres enable the manufacture of lightweight molded articles. Thus, the heat-expandable microspheres of the present invention are preferable for preparing a resin composition comprising at least one base resin selected from rubbers, olefin resins and thermoplastic elastomers or for manufacturing molded articles.

Wet-Powdery Heat-Expandable Microspheres

The wet-powdery heat-expandable microspheres of the present invention comprise the heat-expandable microspheres mentioned above and the liquid compound mentioned below. The wet-powdery heat-expandable microspheres are preferable for preparing or using a resin composition, because such microspheres minimize the scattering of heat-expandable microspheres, which are powdery form, in the preparation or use of the resin composition and improve the dispersion of heat-expandable microspheres in the resin composition.

The amount of the liquid compound in the wet-powdery heat-expandable microspheres is not specifically restricted and preferably ranges from 0.5 to 60 parts by weight to 100 parts by weight of heat-expandable microspheres, more preferably from 1 to 50 parts by weight, further more preferably from 2 to 40 parts by weight, yet further more preferably from 3 to 30 parts by weight and most preferably from 5 to 20 parts by weight. The amount of the liquid compound less than 0.5 parts by weight can not prevent scattering of the heat-expandable microspheres, while the amount of the liquid compound higher than 60 parts by weight can cause nonuniform state of the wet-powdery heat-expandable microspheres.

The process for preparing the wet-powdery heat-expandable microspheres is not specifically restricted if the heat-expandable microspheres are wet with a liquid compound, and the process includes, for example, shaking and/or agitating heat-expandable microspheres with a liquid compound. The shaking and/or agitating can be conducted with a common type of powder mixer that includes, for example, a ribbon mixer, multi-rotor mixer, Henschel mixer, tumbler mixer, planetary mixer, Super Mixer (manufactured by KAWATA MFG Co., Ltd.), High Speed Mixer (manufactured by Fukae Co., Ltd.), New-Gra Machine (manufactured by Seishin Enterprise Co., Ltd) and SV Mixer (manufactured by Kobelco Eco-Solutions Co., Ltd.).

Resin Composition and Preparation Thereof

The resin composition of the present invention essentially comprises the base resin mentioned above and heat-expandable microspheres. The amount of each ingredient in the resin composition is not specifically restricted and the amount of the heat-expandable microspheres preferably ranges from 0.25 to 15 parts by weight to 100 parts by weight of the base resin, more preferably from 0.5 to 12 parts by weight, further more preferably from 1 to 10 parts by weight and yet further more preferably from 1.5 to 8 parts by weight.

The resin composition containing less than 0.25 parts by weight of the heat-expandable microspheres can fail to manufacture sufficiently lightened molded articles. On the other hand, the resin composition containing more than 15 parts by weight of the heat-expandable microspheres can make the resultant molded article brittle to cause peeled surface of the molded articles due to the friction between the molded articles and the outlet port of the molding machine or to cause breakage of the molded articles so as to inhibit continuous molding.

The amount of the heat-expandable microspheres in the resin composition of the present invention to be used as a masterbatch is not specifically restricted and preferably ranges from 25 to 300 parts by weight to 100 parts by weight of the base resin, more preferably from 25 to 250 parts by weight, further more preferably from 40 to 235 parts by weight, yet further more preferably from 65 to 200 parts by weight and most preferably from 90 to 186 parts by weight.

The masterbatch comprising less than 25 parts by weight of the heat-expandable microspheres can lead to poor cost performance because a considerable amount of the masterbatch is required to lighten molded articles. On the other hand, the masterbatch comprising more than 300 parts by weight of the heat-expandable microspheres has high viscosity due to relatively low amount of the base resin, and the high viscosity generates frictional heat during preparation of the masterbatch that expands the heat-expandable microspheres and leads to unstable preparation of the masterbatch, such as inconstant size of the masterbatch pellets or interruption of the masterbatch.

The resin composition of the present invention can optionally comprise various additives in addition to the heat-expandable microspheres and base resin. Those additives include chemical foaming agents, stabilizers, fillers, plasticizers, lubricants, softeners, wetting agents, pigments, antistatic agents, rubber vulcanization cross-linking agents and vulcanization accelerators. Those additives can be added as the third ingredient in addition to the heat-expandable microspheres and base resin.

The chemical foaming agent is not specifically restricted and includes, for example, inorganic chemical foaming agent, such as ammonium carbonate, sodium bicarbonate and sodium nitrate anhydride; and organic chemical foaming agent, such as dinitrosopentamethylenetetramine, N,N'-dimethyl-N,N'-dinitrosoterephthalamide, benzenesulfonyl hydrazide, p,p'-oxybis(benzenesulfonyl hydrazide) and azodicarbonamide. Foaming auxiliaries, such as urea foaming auxiliaries, organic acid foaming auxiliaries and metal salt foaming auxiliaries, can be used along with the chemical foaming agents. One of or a combination of at least two of the chemical foaming agents and foaming auxiliaries can be used.

The stabilizers include antioxidants, such as phenolic stabilizers, sulfuric stabilizers, phosphoric stabilizers, organic tin stabilizers, lead stabilizers and calcium-zinc stabilizers; light stabilizers such as ultraviolet absorbers and hindered amine light stabilizers; and hydrotalcite. One of or a combination of at least two of those stabilizers can be used.

The fillers are not specifically restricted and both inorganic fillers and organic fillers can be used. The inorganic fillers include, for example, glass fiber (including those coated with metals), carbon fiber (including those coated with metals), potassium titanate, silicon carbide, silicon nitride, ceramic fiber, metal fiber, aramid fiber, barium sulfate, calcium sulfate, calcium silicate, calcium carbonate, magnesium carbonate, antimony trioxide, zinc oxide, titanium oxide, magnesium oxide, iron oxide, molybdenum disulfide, magnesium hydroxide, aluminum hydroxide, mica, talc, kaolin, pyrophyllite, bentonite, sericite, zeolite, wollastonite, alumina, clay, ferrite, graphite, gypsum, glass beads, glass balloons and quartz. The organic fillers include, for example, vegetable fibers, such as cellulose, kenaf and wheat bran; animal fibers, such as wool and silk; synthetic fibers such as aramid fiber, phenol fiber, polyester fiber, acrylic fiber, polyolefin fiber including polyethylene and polypropylene, polyvinyl alcohol fiber, polyvinyl chloride fiber and fluorine resin fiber; regenerated fibers such as rayon; semisynthetic fibers, such as cellulose acetate; wood flour, bamboo flour, tofu refuse, rice husks, fruit husks, monosaccharides and polysaccharides such as starches.

One of or a combination of at least two of those fillers can be used.

The plasticizers are not specifically restricted and include, for example, diisononyl phthalate (DINP), dioctyl phthalate (DOP), dibutyl phthalate (DBP), butyl-octyl phthalate (BOP), diisononyl adipate (DINA), trioctyl trimellitate (TOTM), tricresyl phosphate (TCP), acetyl tributyl citrate (ATBC), epoxidized soybean oil and epoxidized linseed oil.

The lubricants are not specifically restricted and include metal soaps such as calcium stearate, magnesium stearate, barium stearate, lead stearate, zinc stearate, calcium laurate, barium laurate, zinc laurate and calcium ricinoleate; hydrocarbon waxes, such as paraffin wax and liquid paraffin; amide waxes, such as stearamide, oleamide, erucamide, methylenebisstearamide and ethylenebisstearamide; ester waxes, such as monoglyceride stearate, stearyl stearate and butyl stearate; higher alcohol waxes such as stearyl alcohol; and modified polytetrafluoroethylene.

The softeners and wetting agents are not specifically restricted if the softeners can be added to soften the base resin and the wetting agents are liquid compounds which are mixed with the heat-expandable microspheres to make wet-powdery heat-expandable microspheres (hereinafter sometimes referred to as wet-powdery microspheres) in order to prevent heat-expandable microspheres from scattering. The softeners and wetting agents include, for example, organic liquid compounds, such as alkylene glycol, polyalkylene glycol, glycerin, process oil, liquid paraffin, naphthene oil, aromatic oil, oils and fats; and inorganic liquid compounds, such as silicone oil. Of those compounds, the organic liquid compounds are preferable to attain the effect of the present invention and process oil, silicone oil and liquid paraffin are more preferable.

The pigments are not specifically restricted and include, for example, carbon black, titanium oxide, kaolin, chrome yellow, phthalocyanine blue and red lead.

The antistatic agents are not specifically restricted and include, for example, anionic antistatic agents and nonionic antistatic agents.

The rubber vulcanization cross-linking agents include sulfurs, such as powdery sulfur, precipitated sulfur, colloidal sulfur and insoluble sulfur; inorganic vulcanizing agent, such as sulfur chloride, selenium and tellurium; sulfur-containing organic compounds, such as morpholine disulfide, alkyl phenol disulfides, thiuram disulfides and dithio-carbamate salt; and organic peroxides, such as 1,1-di-t-butylperoxy-3,3,5-trimethyl cyclohexane, di-t-butyl peroxide, dicumyl peroxide, t-butylcumyl peroxide, 2,5-dimethyl-2,5-di(t-butylperoxy) hexane and 1,3-bis-(t- butylperoxy-isopropyl) benzene. One of or a combination of at least two of those vulcanization cross-linking agents can be used.

The vulcanization accelerators include aldehyde ammonias, such as hexamethylenetetramine; guanidines, such as diphenyl guanidine, di(o-tolyl) guanidine and o-tolyl-biguanide; thioureas, such as thiocarbanilide, di(o-tolyl) thiourea, N, N'-diethyl thiourea and dilauryl thiourea; thiazoles, such as mercaptobenzothiazole, dibenzothiazole disulfide and N, N'-di(ethylthiocarbamoylthio) benzothiazole; sulfenamides, such as N-t-butyl-2-benzothiazyl sulfenamide; thiurams, such as tetramethylthiuram disulfide, tetraethylthiuram disulfide and tetrabutylthiuram disulfide; carbamate salts, such as zinc dimethylthiocarbamate, sodium dimethylthiocarbamate, copper dimethylthiocarbamate, tellurium dimethylthiocarbamate and iron dimethylthiocarbamate; and xanthogenic salts, such as zinc butylthioxanthogenate. One of or a combination of at least two of those vulcanization accelerators can be used.

The resin composition of the present invention is prepared by mixing the base resin and heat-expandable microspheres and dispersing (preferably uniformly) the microspheres in the base resin. The additives described above can be added at this stage. The processes for preparing resin composition include those described below.

1) Preparing a resin composition (premix) by mixing the heat-expandable microspheres, base resin and optionally an additive at a temperature controlled to be lower than the expansion initiation temperature of the heat-expandable microspheres and the melting point and/or softening point of the base resin.
2) Preparing a resin composition (masterbatch) containing the heat-expandable microspheres and base resin by kneading the premix prepared in the step 1) at a temperature lower than the expansion initiation temperature of the heat-expandable microspheres and higher than the melting point and/or softening point of the base resin and by forming the kneaded resin composition into a desired shape as needed.
3) Preparing a resin composition (premix) by kneading the base resin at a temperature lower than the expansion initiation temperature of the heat-expandable microspheres and higher than the melting point and/or softening point of the base resin, then adding the heat-expandable microspheres and optionally an additive and kneading the mixture at a temperature lower than the expansion initiation temperature of the heat-expandable microspheres and higher than the melting point and/or softening point of the base resin.
4) Preparing a resin composition (masterbatch) comprising the heat-expandable microspheres and base resin by forming the premix prepared in the step 3) into a desired shape at a temperature lower than the expansion initiation temperature of the heat-expandable microspheres and higher than the melting point and/or softening point of the base resin.
5) Preparing a resin composition by mixing the masterbatch prepared in the step 2) or 4) and a matrix resin (base resin) at a temperature controlled to be lower than the expansion initiation temperature of the heat-expandable microspheres and the melting point and/or softening point of the base resin contained in the masterbatch and the matrix resin.

The process for preparing the resin composition is not specifically restricted, and preferably includes, for example, mixing with a kneader, roller kneader, mixing roller, mixer, single screw extruder, twin screw extruder or multi-screw extruder.

In an example of the preparation of the resin composition, a base resin is pre-kneaded by a kneading machine, such as a roll mill, kneader, pressure kneader and Banbury mixer, at a temperature higher than the melting point and/or softening point of the base resin and lower than the expansion initiation temperature of the heat-expandable microspheres, preferably a temperature at least 10° C. lower than the expansion initiation temperature, then the heat-expandable microspheres are added to the base resin, and the mixture is kneaded by controlling the kneading temperature not higher than the expansion initiation temperature of the heat-expandable microspheres, if necessary, with a temperature control means, to prepare a premix.

The resultant premix can be extruded from a single screw extruder, twin screw extruder or multi-screw extruder to form the resin composition into strands. The thickness of the strands can be adjusted by changing the diameter of the strand die and/or winding speed of the strand. The resultant strands are cut into a desired length with a cutting machine to be prepared into a masterbatch. The cutting procedure includes cutting just extruded strands followed by cooling down the cut masterbatch and cutting strands cooled down after extrusion.

The cross section of the masterbatch varies depending on the intended use and includes, for example, circle, oval figure and polygonal shape.

The premix can be formed into a sheet of desired dimension by processing the premix with a roll mill, such as double roller mill, where the roller speed and aperture between rollers are adjusted.

The resultant masterbatch can be mixed with a matrix resin to be prepared into a resin composition by a ribbon mixer or multi-rotor mixer at a temperature controlled to be lower than the expansion initiation temperature of the heat-expandable microspheres and the melting point and/or softening point of the base resin of the masterbatch and the matrix resin depending on necessity.

The true specific gravity of the resin composition used as a masterbatch is not specifically restricted and preferably ranges from 0.65 to 1.5, more preferably from 0.70 to 1.3 and further more preferably from 0.75 to 1.0. A resin composition having a true specific gravity lower than 0.65 comprises expanded heat-expandable microspheres which can cause nonuniform dimension of the masterbatch pellets or breakage of the masterbatch precursor being extruded to result in unstable manufacturing of the masterbatch. Such masterbatch comprising expanded heat-expandable microspheres can lead to failure in manufacturing lightweight molded articles because the expanded heat-expandable microspheres have thin shells, poor heat resistance and poor ability to retain the encapsulated blowing agent and the vaporized blowing agent escapes out the shell of the microspheres to make the microspheres shrink or crush. In addition, the strength of the portions near the surface of the molded articles is decreased by the pores made by the vaporized blowing agent and the surface of the molded articles can be peeled due to the friction between the molded articles and the outlet port of the molding machine. On the other hand, a resin composition having a true specific gravity higher than 1.5 can result in nonuniform distribution of pores in molded articles manufactured from the resin composition. The procedure for measuring the true specific gravity of a masterbatch is described in Example.

The resin composition used as a masterbatch can be manufactured into foamed articles in a process where the base resin is melted and/or softened and the heat-expandable microspheres are expanded by heating at a temperature higher than the melting point and/or softening point of the base resin and near the maximum expansion temperature of the heat-expandable microspheres.

The expansion ratio of the foamed articles manufactured by heating a masterbatch under the conditions mentioned above preferably ranges from 10 to 120 times, more preferably from 15 to 100 times, further more preferably from 20 to 85 times and yet further more preferably from 25 to 75 times. An expansion ratio lower than 10 times can result in insufficiently lightened molded articles manufactured with the masterbatch. On the other hand, an expansion ratio higher than 120 times results in rough surface the molded articles and decreased strength of the portions near the surface of the molded articles manufactured from the masterbatch. Such molded articles can have peeled surface due to the friction between the molded articles and the outlet port of the molding machine. The procedure for measuring the expansion ratio of foamed articles is described in Example.

Molded Articles and Manufacturing Process Thereof

The molded articles of the present invention include molded articles manufactured by directly molding the resin composition and those manufactured by molding a mixture containing the resin composition as a masterbatch and a matrix resin.

The molded articles can also include those manufactured by molding the resin composition or the mixture of the masterbatch and a matrix resin to which the additives are added and/or included.

The process of manufacturing the molded articles includes the step of molding the resin composition at a temperature near the maximum expansion temperature of the heat-expandable microspheres comprised in the resin composition. The process of molding the molded articles is not specifically restricted and extrusion molding such as profile extrusion molding is preferable for the resin composition of the present invention. In addition to extrusion molding, injection molding, calendar molding, inflation molding, blow molding, kneading molding, compression molding, vacuum molding and thermoforming can be employed.

The resin composition of the present invention is preferable for effectively lightening molded articles, because the shell of the heat-expandable microspheres comprised in the resin composition comprise the polymer of polymerizable monomers including N-substituted maleimide and the nitrile monomer essentially containing methacrylonitrile and thus the heat-expandable microspheres have high heat resistance and high performance to retain the encapsulated blowing agent to prevent their shrinkage during long-time extrusion molding and prevent peeled surface of molded articles.

In the process of manufacturing molded articles, for example, extrusion molding, the extrusion machine used in extrusion molding has a heater and thermocouple at the extrusion barrel and a hopper for feeding a resin composition. In addition, a screw is equipped in the extrusion barrel to melt/soften, knead, mix and convey the resin composition from the hopper along the direction of extrusion.

The resin composition fed into the barrel is processed into melted and/or softened mixture by heating at a temperature higher than the melting point or softening point of the base resin and near the maximum expansion temperature (molding temperature of molded articles) of the heat-expandable microspheres contained. Thus, the resin composition becomes moldable into an intended form and is extrusion-molded through a die equipped with a heater and thermocouple to be manufactured into molded articles.

The molding temperature of molded articles mentioned herein means the temperature of the melted and/or softened mixture while the mixture is conveyed through the barrel of the extrusion machine.

The molding temperature of molded articles preferably ranges from 160 to 210° C. to optimize the expansion ratio of the molded articles, more preferably from 170 to 210° C., further more preferably from 175 to 205° C., yet further more preferably from 180 to 200° C. and most preferably from 185 to 195° C. The molding temperature lower than 160° C. results in insufficient expansion of the heat-expandable microspheres and can fail to attain intended expansion ratio. On the other hand, the molding temperature higher than 210° C. causes shrinkage of the shell of the heat-expandable microspheres to make the encapsulated blowing agent vaporize and escape out the shell. The shrinkage and escaped blowing agent can lead to failure in manufacturing lightweight molded articles, make pores near the surface of molded articles due to the vaporized blowing agent to decrease the strength of the portions near the surface of the molded articles and cause the surface of the molded articles to peel due to the friction between the molded articles and the outlet port of the molding machine.

If an extrusion machine for molding the articles has a vent, is should be closed during molding because melted and kneaded mixture can be extruded from the vent and inhibit the manufacture of lightweight molded articles.

A vent near the die of an extrusion machine can be connected to a vacuum pump to eliminate voids generated in kneaded mixture.

The time required to extrude a molding composition through the die after it is fed from the hopper of an extrusion machine can be adjusted by the screw speed (rpm). The screw speed can be adjusted according to the types of the extrusion machine and base resin. The time required to extrude a molding composition through the die after it is fed from the hopper (residence time) preferably ranges from 0.5 to 20 minutes, more preferably from 0.7 to 15 minutes, further more preferably from 0.7 to 10 minutes and yet further more preferably from 1 to 7 minutes. A residence time shorter than 0.5 minutes causes insufficient heating of the composition and thus insufficient expansion of heat-expandable microspheres that can lead to failure in molding articles with desired expansion ratio. On the other hand, a residence time longer than 20 minutes will result in poor molding efficiency and low productivity.

The molded articles extruded through a die are usually cooled down by facilities including air-cooling and water-cooling machines and cooling rolls to be manufactured into the intended lightweight molded articles. The molded articles of the present invention can be manufactured with commonly used cooling facilities and take-up facilities.

The expansion ratio of the molded articles of the present invention preferably ranges from 1.2 to 3 times and more preferably from 1.3 to 2.7 times. An expansion ratio higher than 3 times can cause poor strength of the resultant molded articles leading to peeled surface of the molded articles due to the friction between the molded article and the outlet port of the molding machines. The procedure to measure the expansion ratio of molded articles is described in the Examples.

The mean diameter of the pores created by heat-expandable microspheres in a molded article of the present invention preferably ranges from 30 to 300 μm, more preferably from 50 to 200 µm and further more preferably from 70 to 150 µm. A molded article containing pores with a mean diameter smaller than 30 µm can have low expansion ratio. On the other hand, a molded article containing pores with a mean diameter greater than 300 µm can have low strength and have peeled surface due to the friction between the molded articles and the outlet port of the molding machine. The procedure for measuring the mean diameter of the pores in a molded article is described in Example.

The molded articles of the present invention are lightweight and have thermal and sound insulation properties and good appearance. Thus, the molded articles are preferable for construction sealing materials including window sealing materials and door packings; automotive sealing materials including glass run channels and body sealing parts; automotive interior materials including instrumental panels and door trims; automotive exterior materials including bumpers; wallpapers and floorings of buildings; shoe soles; rollers for office automation equipment including transfer rollers and paper feed rollers; and industrial rollers including rolls for iron making and paper manufacturing, wire rolls for printing and other industrial rollers. The molded articles are especially preferable for construction sealing materials, automotive sealing materials, wallpapers, shoe soles and floorings.

The rubber product of the present invention is preferable for various end uses including automotive parts such as hoses and weather-strips; electric and electronic parts including electric wire, wire joints, sealing materials and gaskets; civil engineering and construction parts including preformed gaskets, and waterproof sheeting for construction and civil engineering; rollers for office automation equipment including charging rollers, transfer rollers, developing rollers and paper feed rollers; industrial rollers including rolls for iron making and paper manufacturing, wire rolls for printing, and other industrial rollers; and parts for general industries.

The rubber product of the present invention is especially preferable for manufacturing weather-strips, rubber blankets for printing, automotive water hoses, air hoses, roofing sheets, wire covering and shoe soles.

EXAMPLES

Various Examples of manufacturing the molded article of the present invention are described in detail below. The present invention is not restricted within the scope of those examples. In the following Examples and Comparative Examples, "%" means "wt %" unless otherwise specified.

The properties of the heat-expandable microspheres used and molded articles manufactured in the following Examples and Comparative Examples were measured or evaluated in the following procedures. The heat-expandable microspheres, heat-expandable microspheres in a state of wet powder and molded articles can be respectively referred to as simply "microspheres", "wet-powdery microspheres" and "foamed molded articles".

Mean Particle Size and Particle Size Distribution of Heat-Expandable Microspheres A Microtrac particle size analyzer (9320-HRA, manufactured by Nikkiso Co., Ltd.) was employed as the device for the determination of the D50 of the mean volume diameter, which was defined as the average particle size.

Expansion Initiation Temperature ($T_s$) and the Maximum Expansion Temperature ($T_{max}$)

The maximum expansion temperature was determined with a DMA (DMA Q800, manufactured by TA Instruments). In an aluminum cup of 4.8 mm deep and 6.0 mm in diameter (5.65 mm in inner diameter), 0.5 mg of a sample of heat-expandable microspheres was placed, and the cup was covered with an aluminum cap (5.6 mm in diameter and 0.1 mm thick) to prepare a test sample. The test sample was set on the device and subjected to the pressure of 0.01 N with the compression unit of the device, and the height of the sample was measured. The sample was then heated by elevating the temperature at the rate of 10° C./min from 20 to 300° C., being subjected to the pressure of 0.01 N with the compression unit, and the change in the height of the sample was measured. The temperature at which the height started to increase was determined as the expansion initiation temperature ($T_s$) of the heat-expandable microspheres and the temperature at which the compression unit indicated the highest position was determined as the maximum expansion temperature ($T_{max}$) of the heat-expandable microspheres.

Maximum Expansion Ratio of Heat-Expandable Microspheres

The expansion ratio of heat-expandable microspheres was measured in the following procedure.

A 12 cm long, 13 cm wide and 9 cm high flat-bottomed box was made of aluminum foil, and 1.0 g of heat-expandable microspheres were placed into uniform thickness. The microspheres were heated in a gear oven at a predetermined temperature for 4 minutes to be expanded into hollow particles.

Then the true specific gravities of unheated heat-expandable microspheres and hollow particles obtained by heating heat-expandable microspheres were determined by the liquid substitution method (Archimedean method) with isopropyl alcohol in an atmosphere at 25° C. and 50% RH (relative humidity) as described below.

At first, an empty 100-mL measuring flask was dried and weighed ($WB_1$). Then isopropyl alcohol was poured into the weighed measuring flask to form meniscus accurately, and the measuring flask filled with isopropyl alcohol was weighed ($WB_2$).

The 100-mL measuring flask was then emptied, dried, and weighed ($WS_1$). About 50 mL of the particles (unheated heat-expandable microspheres or hollow particles obtained by heating heat-expandable microspheres) were placed in the weighed measuring flask, and the measuring flask containing the microspheres was weighed ($WS_2$). Then isopropyl alcohol was poured into the measuring flask containing the microspheres to form meniscus accurately without taking bubbles into the isopropyl alcohol, and the flask containing the microspheres and isopropyl alcohol was weighed ($WS_3$). The values, $WB_1$, $WB_2$, $WS_1$, $WS_2$, and $WS_3$, were introduced into the following formula to calculate the true specific gravity (d) of the microspheres.

$$d=[(WS_2-WS_1)\times(WB_2-WB_1)/100]/[(WB_2-WB_1)-(WS_3-WS_2)]$$

The expansion ratio (E1) of the hollow particles obtained by heating heat-expandable microspheres was calculated by dividing the true specific gravity ($d_0$) of unheated heat-expandable microspheres by the true specific gravity ($d_1$) of the hollow particles. The maximum expansion ratio ($E1_{max}$) of heat-expandable microspheres is the expansion ratio of heat-expandable microspheres at their maximum expansion.

Ratio of Multinucleated Microspheres

Heat-expandable microspheres were sorted into fractions according to their particle size range with a sonic classifier (Hand Sifter SW-20-AT, manufactured by Tsutsui Scientific Instrument Co., Ltd.), and heat-expandable microspheres having at least one resin particle inside their shell (multinucleated microspheres), which are contained in each fraction, were visually inspected as follows.

At first, plastic sieves with nylon mesh (JIS Test Sieves, 200 mm in diameter, with openings of 25 µm, 32 µm, 38 µm, 45 µm, 53 µm, and 63 µm respectively) were prepared. Then a classifying device was fabricated by piling a receiving vessel, a sieve of 25 µm opening, a sieve of 32 µm opening, a sieve of 38 µm opening, a sieve of 45 µm opening, a sieve of 53 µm opening and a sieve of 63 µm opening in the order from the bottom to the top, and by mounting a sound generator at the top.

Then 25 g of heat-expandable microspheres were weighed and placed on the sieve of 63 µm opening. Then the sound generator was started to sort the microspheres by changing the sound wave frequency level from 50 Hz, 60 Hz to 50 Hz in the order keeping each frequency for 15 minutes. The sound wave frequency can be changed within the range from 50 to 300 Hz and is not restricted at the above-mentioned levels, because optimum sound wave frequency varies depending on the number of piled sieves, opening of sieves and the property of samples.

After the fractionation, the microspheres of each fraction were collected, and 1 part by weight of the sample of a fraction and 2 parts by weight of an epoxy resin (Araldite Rapid, an epoxy adhesive, supplied by Huntsman Advanced Materials Co., Ltd.) were mixed and cured at 20 to 25° C. for 24 hours. Then the cured solid was sliced with a Microtome (RM2235 manufactured by Leica). The cross section of the sliced solid was inspected through electron microscope (with 300-time magnification) to determine the ratio of multinucleated microspheres in each fraction.

The evaluation was performed by randomly selecting 50 heat-expandable microspheres inspected through electron microscope, and counting the number of multinucleated microspheres among the selected microspheres. The criteria for evaluating the ratio of multinucleated microspheres were defined as A for 0 to 5 multinucleated microspheres (in other words, 0 to 10%), B for 6 to 15 (in other words, over 10 to 30%), C for 16 to 35 (in other words, over 30 to 70%), D for 36 to 45 (in other words, over 70 to 90%), and E for 46 to 50 (in other words, over 90 to 100%).

When almost no heat-expandable microspheres remained on the sieve of the smallest opening, the heat-expandable microspheres were evaluated to have "passed the sieves".

True Specific Gravity of Masterbatch

The true specific gravity of a masterbatch ($d_3$) was measured in the same manner as that for measuring the true specific gravity of unheated heat-expandable microspheres and hollow particles obtained by heating heat-expandable microspheres as described above.

Expansion Ratio of Foamed Articles

The expansion ratio of a masterbatch was measure in the following procedure.

In the same manner for making hollow particles mentioned above, a 12 cm long, 13 cm wide and 9 cm high flat-bottomed box was made of aluminum foil, and 0.5 g of a masterbatch was placed into uniform thickness. The masterbatch was heated in a gear oven at a predetermined temperature for 4 minutes to be prepared into foamed article.

The true specific gravity ($d_4$) of the foamed article was measured in the same manner as that for measuring the true specific gravity of heat-expandable microspheres and hollow particles obtained by heating heat-expandable microspheres. Then the expansion ratio (E2) of the foamed article was calculated by dividing the true specific gravity ($d_3$) of the unheated masterbatch by the true specific gravity of the foamed article ($d_4$) obtained by heating the masterbatch. The maximum expansion ratio ($E2_{max}$) of a masterbatch is the expansion ratio of the masterbatch at its maximum expansion.

Masterbatch Preparation Stability

The stability of continuous 45-minute preparation of a masterbatch was evaluated by the following three criteria.
A: Good. The operation continued without interruption.
B: Not good. The dimension of the masterbatch was unstable though the operation continued without interruption.
C: Poor. The dimension of the masterbatch was further unstable and the operation was interrupted at least once in the operation.

Surface State of Molded Articles

The presence of peeled surface on molded articles was visually inspected and evaluated by the following four criteria.
A: Good. No peeled surfaces were found on molded articles.
B: Fair. Slight peeled surfaces were found on molded articles, though they were acceptable.
C: Not good. Peeled surfaces were frequently found on molded articles.
D: Poor. Large peeled surfaces were frequently found on molded articles.

Article Molding Stability

The stability of 45-minute molding of articles was evaluated by the following three criteria.
A: Good. Articles were continuously molded for 45 minutes without breakage and molded articles have no cracks at their ends or nothing adhered.
B: Not good. Articles were continuously molded for 45 minutes without breakage but molded articles have cracks at their ends or something adhered.
C: Poor. Articles were not continuously molded for 45 minutes due to their breakage at least once during molding.

Mean Pore Size in Molded Articles

A molded article was cut and the microphotograph of the cross section was taken through a scanning electron microscope (VE-8800, manufactured by Keyence Corporation) with an acceleration voltage of 20 kV and a magnification ratio of 30. The size of the pores in an optionally selected area (a 3 mm square) of the microphotograph was measured and the result was calculated into mean pore size which was defined as the mean pore size of the molded article.

Specific Gravity and Expansion Ratio of Molded Articles

The specific gravity (D1) of a molded article was measured by the liquid substitution method using the analytical electronic balance AX200 (manufactured by Shimadzu Corporation). Then the specific gravity (D2) of a base molded article prepared by molding the base resin of the molded article, a mixture of the base resin and additives without microspheres or a kneaded mixture of the base resin and additives without microspheres was measured. The expansion ratio of the molded article was calculated by the following formula.

$$\text{Expansion Ratio of a Molded Article (Times)} = D2/D1$$

Example of Production 1-1

An aqueous dispersion medium was prepared by adding 150 g of sodium chloride, 65 g of colloidal silica containing 20 wt % of silica, 1 g of polyvinyl pyrolidone and 0.2 g of ethylenediaminetetraacetic acid tetrasodium salt to 600 g of deionized water and adjusting the pH at 3.

An oily mixture was prepared by mixing 55 g of N-phenyl maleimide, 25 g of methacrylonitrile, 160 g of acrylonitrile, 8.5 g of isobornyl methacrylate, 1.5 g of PEG (200) diacrylate, 1.5 g of 2,2'-azobis(2,4-dimethylvaleronitrile), 32.5 g of isopentane, 35 g of isooctane and 5 g of isododecane.

The aqueous dispersion medium and the oily mixture were mixed and agitated with a Homo-mixer (TK Homomixer, manufactured by Primix Corporation) at 10,000 rpm for 1 min to be prepared into a suspension. Then the suspension was transferred into a compressive reactor of 1.5-liter capacity, purged with nitrogen and polymerized at 60° C. with the initial reaction pressure of 0.3 MPa and agitation at 80 rpm for 20 hours. The resultant polymerization liquid was filtered and dried to be prepared into the heat-expandable microspheres 1. The properties of the heat-expandable microspheres 1 are shown in Table 1.

Examples of Production 1-2 to 1-15 and Comparative Examples of Production 1-1 to 1-5

In Examples of production 1-2 to 1-15 and Comparative examples of production 1-1 to 1-5, the microspheres 2 to 20 were prepared in the same manner as in Example of manufacture 1-1 except that the conditions for reaction were changed as shown in Tables 1 and 2. The properties of the resultant microspheres were evaluated and shown in Tables 1 and 2.

TABLE 1

| | | | | Examples of production | | | |
|---|---|---|---|---|---|---|---|
| | | | | 1-1 | 1-2 | 1-3 | 1-4 |
| Heat-expandable microspheres | | | | Heat-expandable microshere 1 | Heat-expandable microshere 2 | Heat-expandable microshere 3 | Heat-expandable microshere 4 |
| Aqueous dispersion medium | Deionized water | | | 600 | 600 | 600 | 600 |
| | Sodium chloride | | | 150 | 150 | 150 | 150 |
| | Colloidal silica | | | 65 | 55 | 67 | 45 |
| | PVP | | | 1 | 1 | 1 | 1 |
| | EDTA | | | 0.2 | 0.2 | 0.2 | 0.2 |
| | pH | | | 3 | 3 | 3 | 3 |
| Oily mixture | Polymerizable component | Monomer component | N-phenyl maleimide | 55 | 33 | | |
| | | | N-cyclohexyl maleimide | | | 55 | 18 |
| | | | Acrylonitrile | 160 | 160 | 170 | 170 |
| | | | Methacrylonitrile | 25 | 47 | 15 | 52 |
| | | | Methacrylic acid | | | | |
| | | | Crotonic acid | | | | |
| | | | Isobornyl methacrylate | 8.5 | | | |
| | | | Methyl methacrylate | | 8.5 | | 8.5 |
| | | | Dicyclopentenyl acrylate | | | 8.5 | |
| | | Cross-linking agent | PEG (200) diacrylate | 1.5 | 1.5 | 1.5 | 1.5 |
| | | | Ethylene glycol dimethacrylate | | | | |
| | Blowing agent | | Isopentane | 32.5 | 32.5 | 32.5 | 32.5 |
| | | | n-pentane | | | | |
| | | | Isooctane | 35 | 35 | 35 | 35 |
| | | | Isododecane | 5 | 5 | 5 | 5 |
| | Initiator | | 2,2'-azobis(2,4-dimethylvaleronitrile) | 1.5 | 1.5 | 1.5 | 1.5 |
| | | | 2,2'-azobis(isobutyronitrile) | | | | |
| Polymerization condition for heat-expandable microsphere | | | Polymerization temp. (° C.) | 60 | 60 | 60 | 60 |
| | | | Polymerization time (hr) | 20 | 20 | 20 | 20 |
| Properties of heat-expandable microspheres | Amount of N-substituted maleimide in polymerizable component (wt %) | | | 22.0 | 13.2 | 22.0 | 7.20 |
| | Amount of N-substituted maleimide : Amount of methacrylonitrile | | | 2.20 | 0.70 | 3.67 | 0.35 |
| | Total amount of methacrylonitrile and N-maleimide in polymerizable component (wt %) | | | 32.0 | 32.0 | 28.0 | 28.0 |
| | Amount of nitrile monomer in polymerizable component (wt %) | | | 74.0 | 82.8 | 74.0 | 88.8 |
| | Amount of methacrylonitrile in nitrile monomer (wt %) | | | 13.5 | 22.7 | 8.11 | 23.4 |
| | Amount of methacrylonitrile in polymerizable component (wt %) | | | 10.0 | 18.8 | 6.00 | 20.8 |
| | Mean particle size (D50) (μm) | | | 20 | 28 | 17 | 36 |
| | Expansion initiation temp. (Ts) | | | 165 | 157 | 173 | 155 |
| | Maximum expansion temp. (Tmax) | | | 190 | 189 | 202 | 185 |
| | Specific gravity at maximum expansion | | | 0.012 | 0.0080 | 0.016 | 0.0050 |

TABLE 1-continued

|  |  | | | | |
|---|---|---|---|---|---|
| Maximum expansion ratio (E1max) | | 83 | 125 | 63 | 200 |
| Evaluation of the amount of multinucleated particles | Heat-expandable microsphere passed 25 μm opening | A | A | A | A |
| | Heat-expandable microsphere of 25 to 32 μm opening | A | A | A | A |
| | Heat-expandable microsphere of 32 to 38 μm opening | A | A | B | A |
| | Heat-expandable microsphere of 38 to 45 μm opening | B | A | B | A |
| | Heat-expandable microsphere of 45 to 53 μm opening | B | B | Passed sieves | A |

| | | | | Examples of production | | |
|---|---|---|---|---|---|---|
| | | | | 1-5 | 1-6 | 1-7 |
| Heat-expandable microspheres | | | | Heat-expandable microshere 5 | Heat-expandable microshere 6 | Heat-expandable microshere 7 |
| Aqueous dispersion medium | Deionized water | | | 600 | 600 | 600 |
| | Sodium chloride | | | 150 | 150 | 150 |
| | Colloidal silica | | | 50 | 68 | 65 |
| | PVP | | | 1 | 1 | 1 |
| | EDTA | | | 0.2 | 0.2 | 0.2 |
| | pH | | | 3 | 3 | 3 |
| Oily mixture | Polymerizable component | Monomer component | N-phenyl maleimide | | | |
| | | | N-cyclohexyl maleimide | 35 | 25 | 68 |
| | | | Acrylonitrile | 170 | 185 | 155 |
| | | | Methacrylonitrile | 35 | 30 | 17 |
| | | | Methacrylic acid | | | |
| | | | Crotonic acid | | | |
| | | | Isobornyl methacrylate | 8.5 | | |
| | | | Methyl methacrylate | | 8.5 | |
| | | | Dicyclopentenyl acrylate | | | 8.5 |
| | | Cross-linking agent | PEG (200) diacrylate | 1.5 | 1.5 | 1.5 |
| | | | Ethylene glycol dimethacrylate | | | |
| | Blowing agent | | Isopentane | 32.5 | 32.5 | 32.5 |
| | | | n-pentane | | | |
| | | | Isooctane | 35 | 35 | 35 |
| | | | Isododecane | 5 | 5 | 5 |
| | Initiator | | 2,2'-azobis (2,4-dimethyl-valeronitrile) | 1.5 | 1.5 | 1.5 |
| | | | 2,2'-azobis (isobutyro-nitrile) | | | |
| Polymerization condition for heat-expandable microsphere | | | Polymerization temp. (° C.) | 60 | 60 | 60 |
| | | | Polymerization time (hr) | 20 | 20 | 20 |
| Properties of heat-expandable microspheres | Amount of N-substituted maleimide in polymerizable component (wt %) | | | 14.0 | 10.0 | 27.2 |
| | Amount of N-substituted maleimide: Amount of methacrylonitrile | | | 1.00 | 0.83 | 4.00 |
| | Total amount of methacrylonitrile and N-maleimide in polymerizable component (wt %) | | | 28.0 | 22.0 | 34.0 |
| | Amount of nitrile monomer in polymerizable component (wt %) | | | 82.0 | 86.0 | 68.8 |
| | Amount of methacrylonitrile in nitrile monomer (wt %) | | | 17.1 | 14.0 | 9.88 |
| | Amount of methacrylonitrile in polymerizable component (wt %) | | | 14.0 | 12.0 | 6.80 |
| | Mean particle size (D50) (μm) | | | 24 | 22 | 21 |
| | Expansion initiation temp. (Ts) | | | 161 | 171 | 165 |

TABLE 1-continued

|  |  |  |  |  |
|---|---|---|---|---|
| Maximum expansion temp. (Tmax) |  | 195 | 190 | 187 |
| Specific gravity at maximum expansion |  | 0.010 | 0.014 | 0.018 |
| Maximum expansion ratio (E1max) |  | 100 | 71 | 56 |
| Evaluation of the amount of multinucleated particles | Heat-expandable microsphere passed 25 μm opening | A | A | A |
|  | Heat-expandable microsphere of 25 to 32 μm opening | A | A | A |
|  | Heat-expandable microsphere of 32 to 38 μm opening | A | A | B |
|  | Heat-expandable microsphere of 38 to 45 μm opening | A | A | B |
|  | Heat-expandable microsphere of 45 to 53 μm opening | B | B | C |

|  |  |  |  | Examples of production | | |
|---|---|---|---|---|---|---|
|  |  |  |  | 1-8 | 1-9 | 1-10 |
| Heat-expandable microspheres |  |  |  | Heat-expandable microshere 8 | Heat-expandable microshere 9 | Heat-expandable microshere 10 |
| Aqueous dispersion medium | Deionized water |  |  | 600 | 600 | 600 |
|  | Sodium chloride |  |  | 150 | 150 | 150 |
|  | Colloidal silica |  |  | 50 | 72 | 70 |
|  | PVP |  |  | 1 | 1 | 1 |
|  | EDTA |  |  | 0.2 | 0.2 | 0.2 |
|  | pH |  |  | 3 | 3 | 3 |
| Oily mixture | Polymerizable component | Monomer component | N-phenyl maleimide | 30 | 87 | 82 |
|  |  |  | N-cyclohexyl maleimide |  |  |  |
|  |  |  | Acrylonitrile | 150 | 140 | 125 |
|  |  |  | Methacrylonitrile | 60 | 13 | 33 |
|  |  |  | Methacrylic acid |  |  |  |
|  |  |  | Crotonic acid |  |  |  |
|  |  |  | Isobornyl methacrylate |  |  | 8.5 |
|  |  |  | Methyl methacrylate | 8.5 | 8.5 |  |
|  |  |  | Dicyclopentenyl acrylate |  |  |  |
|  |  | Cross-linking agent | PEG (200) diacrylate | 1.5 | 1.5 | 1.5 |
|  |  |  | Ethylene glycol dimethacrylate |  |  |  |
|  | Blowing agent |  | Isopentane | 32.5 | 32.5 | 32.5 |
|  |  |  | n-pentane |  |  |  |
|  |  |  | Isooctane | 35 | 35 | 35 |
|  |  |  | Isododecane | 5 | 5 | 5 |
|  | Initiator |  | 2,2'-azobis (2,4-dimethyl-valeronitrile) | 1.5 | 1.5 | 1.5 |
|  |  |  | 2,2'-azobis (isobutyro-nitrile) |  |  |  |
| Polymerization condition for heat-expandable microsphere |  |  | Polymerization temp. (° C.) | 60 | 60 | 60 |
|  |  |  | Polymerization time (hr) | 20 | 20 | 20 |
| Properties of heat-expandable microspheres | Amount of N-substituted maleimide in polymerizable component (wt %) |  |  | 12.0 | 34.8 | 32.8 |
|  | Amount of N-substituted maleimide: Amount of methacrylonitrile |  |  | 0.50 | 6.69 | 2.48 |
|  | Total amount of methacrylonitrile and N-maleimide in polymerizable component (wt %) |  |  | 36.0 | 40.0 | 46.0 |
|  | Amount of nitrile monomer in polymerizable component (wt %) |  |  | 84.0 | 61.2 | 63.2 |
|  | Amount of methacrylonitrile in nitrile monomer (wt %) |  |  | 28.6 | 8.50 | 20.9 |
|  | Amount of methacrylonitrile in polymerizable component (wt %) |  |  | 24.0 | 5.20 | 13.2 |
|  | Mean particle size (D50) (μm) |  |  | 31 | 15 | 12 |
|  | Expansion initiation temp. (Ts) |  |  | 152 | 147 | 145 |
|  | Maximum expansion temp. (Tmax) |  |  | 187 | 182 | 180 |
|  | Specific gravity at maximum expansion |  |  | 0.0070 | 0.025 | 0.035 |

TABLE 1-continued

|  |  | | | |
|---|---|---|---|---|
| Maximum expansion ratio (E1max) | | 143 | 40 | 29 |
| Evaluation of the amount of multinucleated particles | Heat-expandable microsphere passed 25 μm opening | A | A | A |
| | Heat-expandable microsphere of 25 to 32 μm opening | A | B | A |
| | Heat-expandable microsphere of 32 to 38 μm opening | A | B | A |
| | Heat-expandable microsphere of 38 to 45 μm opening | A | B | B |
| | Heat-expandable microsphere of 45 to 53 μm opening | A | Passed sieves | Passed sieves |

TABLE 2

| | | | | Examples of production | | | |
|---|---|---|---|---|---|---|---|
| | | | | 1-11 | 1-12 | 1-13 | 1-14 |
| Heat-expandable microspheres | | | | Heat-expandable microsphere 11 | Heat-expandable microsphere 12 | Heat-expandable microsphere 13 | Heat-expandable microsphere 14 |
| Aqueous dispersion medium | Deionized water | | | 600 | 600 | 600 | 600 |
| | Sodium chloride | | | 150 | 150 | 150 | 150 |
| | Colloidal silica | | | 58 | 54 | 71 | 70 |
| | PVP | | | 1 | 1 | 1 | 1 |
| | EDTA | | | 0.2 | 0.2 | 0.2 | 0.2 |
| | pH | | | 3 | 3 | 3 | 3 |
| Oily mixture | Polymerizable component | Monomer component | N-phenyl maleimide | 55 | 55 | | |
| | | | N-cyclohexyl maleimide | | | 25 | 25 |
| | | | Acrylonitrile | 160 | 160 | 185 | 185 |
| | | | Methacrylonitrile | 25 | 25 | 30 | 30 |
| | | | Methacrylic acid | | | | |
| | | | Crotonic acid | | | | |
| | | | Isobornyl methacrylate | 8.5 | 8.5 | 8.5 | 8.5 |
| | | | Methyl methacrylate | | | | |
| | | | Dicyclopentenyl acrylate | | | | |
| | | Cross-linking agent | PEG (200) diacrylate | 1.5 | 1.5 | 1.5 | 1.5 |
| | | | Ethylene glycol dimethacrylate | | | | |
| | Blowing agent | | Isopentane | 18 | | 54.5 | 43.5 |
| | | | n-pentane | | | | |
| | | | Isooctane | 54.5 | 72.5 | 18 | 29 |
| | | | Isododecane | | | | |
| | Initiator | | 2,2'-azobis (2,4-dimethyl-valeronitrile) | 1.5 | 1.5 | 1.5 | 1.5 |
| | | | 2,2'-azobis (isobutyro-nitrile) | | | | |
| Polymerization condition for heat-expandable microsphere | | | Polymerization temp. (° C.) | 60 | 60 | 60 | 60 |
| | | | Polymerization time (hr) | 20 | 20 | 20 | 20 |
| Properties of heat-expandable microspheres | Amount of N-substituted maleimide in polymerizable component (wt %) | | | 22.0 | 22.0 | 10.0 | 10.0 |
| | Amount of N-substituted maleimide: Amount of methacrylonitrile | | | 2.20 | 2.20 | 0.83 | 0.83 |
| | Total amount of methacrylonitrile and N-maleimide in polymerizable component (wt %) | | | 32.0 | 32.0 | 22.0 | 22.0 |
| | Amount of nitrile monomer in polymerizable component (wt %) | | | 74.0 | 74.0 | 86.0 | 86.0 |
| | Amount of methacrylonitrile in nitrile monomer (wt %) | | | 13.5 | 13.5 | 14.0 | 14.0 |

TABLE 2-continued

|  |  | | | | |
|---|---|---|---|---|---|
| Amount of methacrylonitrile in polymerizable component (wt %) | | 10.0 | 10.0 | 12.0 | 12.0 |
| Mean particle size (D50) (μm) | | 20 | 20 | 21 | 23 |
| Expansion initiation temp. (Ts) | | 171 | 178 | 148 | 155 |
| Maximum expansion temp. (Tmax) | | 192 | 195 | 183 | 190 |
| Specific gravity at maximum expansion | | 0.015 | 0.02 | 0.0095 | 0.012 |
| Maximum expansion ratio (E1max) | | 67 | 50 | 105 | 83 |
| Evaluation of the amount of multinucleated particles | Heat-expandable microsphere passed 25 μm opening | A | A | A | A |
| | Heat-expandable microsphere of 25 to 32-μm opening | A | A | A | A |
| | Heat-expandable microsphere of 32 to 38 μm opening | A | A | A | A |
| | Heat-expandable microsphere of 38 to 45 μm opening | B | B | A | A |
| | Heat-expandable microsphere of 45 to 53 μm opening | B | B | B | B | z

|  |  |  | Examples of production | Comparative examples of production | |
|---|---|---|---|---|---|
|  |  |  | 1-15 | 1-1 | 1-2 |
| Heat-expandable microspheres | | | Heat-expandable microsphere 15 | Heat-expandable microsphere 16 | Heat-expandable microsphere 17 |
| Aqueous dispersion medium | Deionized water | | 600 | 600 | 600 |
| | Sodium chloride | | 150 | 150 | 150 |
| | Colloidal silica | | 69 | 65 | 65 |
| | PVP | | 1 | 1 | 1 |
| | EDTA | | 0.2 | 0.2 | 0.2 |
| | pH | | 3 | 3 | 3 |
| Oily mixture | Polymerizable component | Monomer component | N-phenyl maleimide | | |
| | | | N-cyclohexyl maleimide | 25 | | |
| | | | Acrylonitrile | 185 | 160 | 111 |
| | | | Methacrylonitrile | 30 | 76 | 111 |
| | | | Methacrylic acid | | | |
| | | | Crotonic acid | | | 25 |
| | | | Isobornyl methacrylate | 8.5 | | |
| | | | Methyl methacrylate | | 12 | |
| | | | Dicyclopentenyl acrylate | | | |
| | | Cross-linking agent | PEG (200) diacrylate | 1.5 | | |
| | | | Ethylene glycol dimethacrylate | | 2 | 3 |
| | Blowing agent | | Isopentane | 36.3 | | 75 |
| | | | n-pentane | | 50 | |
| | | | Isooctane | 36.3 | | |
| | | | Isododecane | | | |
| | Initiator | | 2,2'-azobis (2,4-dimethyl-valeronitrile) | 1.5 | | 1 |
| | | | 2,2'-azobis (isobutyronitrile) | | | 1 |
| Polymerization condition for heat-expandable microsphere | | | Polymerization temp. (° C.) | 60 | 60 | 60 |
| | | | Polymerization time (hr) | 20 | 20 | 20 |
| Properties of heat-expandable microspheres | Amount of N-substituted maleimide in polymerizable component (wt %) | | | 10.0 | 0 | 0 |
| | Amount of N-substituted maleimide: Amount of methacrylonitrile | | | 0.83 | 0 | 0 |

TABLE 2-continued

|  |  |  |  |  |
|---|---|---|---|---|
| Total amount of methacrylonitrile and N-maleimide in polymerizable component (wt %) |  | 22.0 | 30.4 | 44.4 |
| Amount of nitrile monomer in polymerizable component (wt %) |  | 86.0 | 94.4 | 88.8 |
| Amount of methacrylonitrile in nitrile monomer (wt %) |  | 14.0 | 32.2 | 50.0 |
| Amount of methacrylonitrile in polymerizable component (wt %) |  | 12.0 | 30.4 | 44.4 |
| Mean particle size (D50) (μm) |  | 25 | 20 | 25 |
| Expansion initiation temp. (Ts) |  | 159 | 150 | 140 |
| Maximum expansion temp. (Tmax) |  | 193 | 170 | 197 |
| Specific gravity at maximum expansion |  | 0.011 | 0.011 | 0.0090 |
| Maximum expansion ratio (E1max) |  | 91 | 91 | 111 |
| Evaluation of the amount of multinucleated particles | Heat-expandable microsphere passed 25 μm opening | A | A | A |
|  | Heat-expandable microsphere of 25 to 32-μm opening | A | A | A |
|  | Heat-expandable microsphere of 32 to 38 μm opening | A | A | A |
|  | Heat-expandable microsphere of 38 to 45 μm opening | A | A | A |
|  | Heat-expandable microsphere of 45 to 53 μm opening | B | B | B | z

|  |  |  |  | Comparative examples of production | | |
|---|---|---|---|---|---|---|
|  |  |  |  | 1-3 | 1-4 | 1-5 |
| Heat-expandable microspheres |  |  |  | Heat-expandable microsphere 18 | Heat-expandable microsphere 19 | Heat-expandable microsphere 20 |
| Aqueous dispersion medium | Deionized water |  |  | 600 | 600 | 600 |
|  | Sodium chloride |  |  | 150 | 150 | 150 |
|  | Colloidal silica |  |  | 65 | 50 | 45 |
|  | PVP |  |  | 1 | 1 | 1 |
|  | EDTA |  |  | 0.2 | 0.2 | 0.2 |
|  | pH |  |  | 3 | 3 | 3 |
| Oily mixture | Polymerizable component | Monomer component | N-phenyl maleimide |  | 20 |  |
|  |  |  | N-cyclohexyl maleimide |  |  | 20 |
|  |  |  | Acrylonitrile | 82 | 167 | 167 |
|  |  |  | Methacrylonitrile | 82 |  |  |
|  |  |  | Methacrylic acid | 83 | 1 |  |
|  |  |  | Crotonic acid |  |  |  |
|  |  |  | Isobornyl methacrylate |  |  |  |
|  |  |  | Methyl methacrylate |  | 62 |  |
|  |  |  | Dicyclopentenyl acrylate |  |  | 63 |
|  | Cross-link-ing agent | PEG (200) diacrylate |  |  |  |  |
|  |  | Ethylene glycol dimethacrylate |  | 3 |  |  |
|  | Blowing agent | Isopentane |  | 25 |  |  |
|  |  | n-pentane |  |  | 50 | 50 |
|  |  | Isooctane |  |  | 40 |  |
|  |  | Isododecane |  |  |  |  |

TABLE 2-continued

| | | | | | |
|---|---|---|---|---|---|
| | Initiator | 2,2'-azobis (2,4-dimethyl-valeronitrile) | 1 | | |
| | | 2,2'-azobis (isobutyronitrile) | | 1 | 1 |
| Polymerization condition for heat-expandable microsphere | | Polymerization temp. (° C.) | 60 | 70 | 70 |
| | | Polymerization time (hr) | 20 | 20 | 20 |
| Properties of heat-expandable microspheres | Amount of N-substituted maleimide in polymerizable component (wt %) | | 0 | 8.00 | 8.00 |
| | Amount of N-substituted maleimide: Amount of methacrylonitrile | | 0 | Calculation impossible | Calculation impossible |
| | Total amount of methacrylonitrile and N-maleimide in polymerizable component (wt %) | | 32.8 | 8.00 | 8.00 |
| | Amount of nitrile monomer in polymerizable component (wt %) | | 65.6 | 66.8 | 66.8 |
| | Amount of methacrylonitrile in nitrile monomer (wt %) | | 50.0 | 0 | 0 |
| | Amount of methacrylonitrile in polymerizable component (wt %) | | 32.8 | 0 | 0 |
| | Mean particle size (D50) (μm) | | 22 | 20 | 22 |
| | Expansion initiation temp. (Ts) | | 160 | 129 | 132 |
| | Maximum expansion temp. (Tmax) | | 200 | 168 | 171 |
| | Specific gravity at maximum expansion | | 0.015 | 0.045 | 0.060 |
| | Maximum expansion ratio (E1max) | | 67 | 22 | 17 |
| Evaluation of the amount of multinucleated particles | | Heat-expandable microsphere passed 25 μm opening | A | C | C |
| | | Heat-expandable microsphere of 25 to 32-μm opening | A | C | C |
| | | Heat-expandable microsphere of 32 to 38 μm opening | A | D | D |
| | | Heat-expandable microsphere of 38 to 45 μm opening | A | E | E |
| | | Heat-expandable microsphere of 45 to 53 μm opening | B | E | E |

Example 1-1

A resin composition was prepared by mixing 100 parts by weight of the base resin (1) (a styrene elastomer, AR-SC-65, produced by Aronkasei Co., Ltd., specific gravity 0.90, softening point 66° C.), 3 parts by weight of the heat-expandable microspheres 1 and 0.3 parts by weight of a process oil with a ribbon mixer. The heat-expandable microspheres in the resin composition were wet-powdery heat-expandable microspheres.

The resultant resin composition was fed to the hopper of an extruder (Lab Plastomill ME-25, a double screw extruder, manufactured by Toyo Seiki Seisaku-sho, Ltd.). The resin composition was melted and kneaded in the barrel at a screw speed of 45 rpm (to adjust the residence time to 4.5 minutes) by adjusting the temperature of the kneaded mixture at 190° C. and extruded into a sheet-formed molded article (148 mm wide and 1.0 mm thick) through a T die (150 mm wide and 1.0-mm gap between lips) the temperature of which was adjusted at 190° C.

The properties of the resultant molded article, i.e., specific gravity, expansion ratio, the mean diameter of the pores in the molded article and surface state, and molding stability were evaluated. The results are shown in Table 3.

Examples 1-2 to 1-20 and Comparative Examples 1-1 to 1-5

The resin compositions and molded articles in Examples 1-2 to 1-20 and Comparative examples 1-1 to 1-5 were prepared or manufacture in the same manner as that in Example 1-1 except that the ingredients of the compositions, molding temperatures and screw speeds were changed as shown in Tables 3 to 5. The heat-expandable microspheres comprised in the resin compositions of Examples 1-2 to 1-20 were wet-powdery heat-expandable microspheres like as that in Example 1. The properties of the molded articles, i.e., specific gravity, expansion ratio, the mean diameter of the pores in the molded articles and surface state, and molding stability were evaluated. The results are shown in Tables 3 to 5.

TABLE 3

|  |  | Examples | | | | |
| --- | --- | --- | --- | --- | --- | --- |
|  |  | 1-1 | 1-2 | 1-3 | 1-4 | 1-5 |
| Resin composition | Heat-expandable microspheres | Heat-expandable microsphere 1 | Heat-expandable microsphere 2 | Heat-expandable microsphere 3 | Heat-expandable microsphere 3 | Heat-expandable microsphere 3 |
|  | Base resin | Base resin (1) | Base resin (1) | Base resin (1) | Base resin (1) | Base resin (1) |
|  | Amount of Heat-expandable microsphere (parts by weight) | 3 | 3 | 3 | 3 | 3 |
|  | Amount of process oil (parts by weight) | 0.3 | 0.3 | 0.3 | 0.3 | 0.3 |
| Molding temp. (° C.) |  | 190 | 190 | 200 | 205 | 190 |
| Screw speed (rpm) |  | 45 | 45 | 45 | 50 | 35 |
| Residence time (min) |  | 4.5 | 4.5 | 4.5 | 3 | 8 |
| Properties of molded articles | Specific gravity | 0.51 | 0.46 | 0.55 | 0.55 | 0.58 |
|  | Expansion ratio | 1.8 | 2.0 | 1.6 | 1.6 | 1.6 |
|  | Mean diameter of pores in molded articles (μm) | 98 | 133 | 86 | 88 | 82 |
|  | Surface state | A | A | A | A | A |
|  | Molding stability | A | A | A | A | A |

|  |  | Examples | | | | |
| --- | --- | --- | --- | --- | --- | --- |
|  |  | 1-6 | 1-7 | 1-8 | 1-9 | 1-10 |
| Resin composition | Heat-expandable microspheres | Heat-expandable microsphere 3 | Heat-expandable microsphere 4 | Heat-expandable microsphere 5 | Heat-expandable microsphere 6 | Heat-expandable microsphere 7 |
|  | Base resin | Base resin (1) | Base resin (1) | Base resin (1) | Base resin (1) | Base resin (1) |
|  | Amount of Heat-expandable microsphere (parts by weight) | 3 | 0.5 | 1.5 | 3 | 3 |
|  | Amount of process oil (parts by weight) | 0.3 | 0.05 | 0.15 | 0.3 | 0.3 |
| Molding temp. (° C.) |  | 180 | 180 | 190 | 180 | 180 |
| Screw speed (rpm) |  | 25 | 45 | 45 | 45 | 45 |
| Residence time (min) |  | 13 | 4.5 | 4.5 | 4.5 | 4.5 |
| Properties of molded articles | Specific gravity | 0.62 | 0.64 | 0.56 | 0.54 | 0.57 |
|  | Expansion ratio | 1.5 | 1.4 | 1.6 | 1.7 | 1.6 |
|  | Mean diameter of pores in molded articles (μm) | 77 | 182 | 110 | 90 | 85 |
|  | Surface state | B | B | A | A | A |
|  | Molding stability | A | A | A | A | A |

TABLE 4

|  |  | Examples | | | | |
| --- | --- | --- | --- | --- | --- | --- |
|  |  | 1-11 | 1-12 | 1-13 | 1-14 | 1-15 |
| Resin composition | Heat-expandable microspheres | Heat-expandable microsphere 8 | Heat-expandable microsphere 9 | Heat-expandable microsphere 10 | Heat-expandable microsphere 11 | Heat-expandable microsphere 12 |
|  | Base resin | Base resin (1) | Base resin (1) | Base resin (1) | Base resin (1) | Base resin (1) |
|  | Amount of Heat-expandable microsphere (parts by weight) | 3 | 3 | 3 | 3 | 3 |
|  | Amount of process oil (parts by weight) | 0.3 | 0.3 | 0.3 | 0.3 | 0.3 |
| Molding temp. (° C.) |  | 180 | 180 | 180 | 190 | 190 |
| Screw speed (rpm) |  | 45 | 45 | 45 | 45 | 45 |
| Residence time (min) |  | 4.5 | 4.5 | 4.5 | 4.5 | 4.5 |
| Properties of molded articles | Specific gravity | 0.43 | 0.66 | 0.69 | 0.57 | 0.66 |
|  | Expansion ratio | 2.1 | 1.4 | 1.3 | 1.6 | 1.4 |
|  | Mean diameter of pores in molded articles (μm) | 161 | 72 | 52 | 89 | 79 |
|  | Surface state | B | A | A | A | A |
|  | Molding stability | A | A | A | A | A |

TABLE 4-continued

|  |  | Examples | | | | |
| --- | --- | --- | --- | --- | --- | --- |
|  |  | 1-16 | 1-17 | 1-18 | 1-19 | 1-20 |
| Resin composition | Heat-expandable microspheres | Heat-expandable microsphere 13 | Heat-expandable microsphere 14 | Heat-expandable microsphere 15 | Heat-expandable microsphere 1 | Heat-expandable microsphere 2 |
|  | Base resin | Base resin (1) | Base resin (1) | Base resin (1) | Base resin (1) | Base resin (1) |
|  | Amount of Heat-expandable microsphere (parts by weight) | 3 | 3 | 3 | 7 | 14 |
|  | Amount of process oil (parts by weight) | 0.3 | 0.3 | 0.3 | 0.7 | 1.4 |
| Molding temp. (° C.) |  | 180 | 190 | 180 | 190 | 180 |
| Screw speed (rpm) |  | 45 | 45 | 45 | 45 | 45 |
| Residence time (min) |  | 4.5 | 4.5 | 4.5 | 4.5 | 4.5 |
| Properties of molded articles | Specific gravity | 0.55 | 0.52 | 0.49 | 0.42 | 0.35 |
|  | Expansion ratio | 1.6 | 1.7 | 1.8 | 2.1 | 2.6 |
|  | Mean diameter of pores in molded articles (μm) | 119 | 108 | 101 | 96 | 94 |
|  | Surface state | B | A | A | A | B |
|  | Molding stability | A | A | A | A | A |

TABLE 5

|  |  | Comparative examples | | | | |
| --- | --- | --- | --- | --- | --- | --- |
|  |  | 1-1 | 1-2 | 1-3 | 1-4 | 1-5 |
| Resin composition | Heat-expandable microspheres | Heat-expandable microsphere 16 | Heat-expandable microsphere 17 | Heat-expandable microsphere 18 | Heat-expandable microsphere 19 | Heat-expandable microsphere 20 |
|  | Base resin | Base resin (1) | Base resin (1) | Base resin (1) | Base resin (1) | Base resin (1) |
|  | Amount of Heat-expandable microsphere (parts by weight) | 3 | 3 | 3 | 3 | 3 |
|  | Amount of process oil (parts by weight) | 0.3 | 0.3 | 0.3 | 0.3 | 0.3 |
| Molding temp. (° C.) |  | 180 | 190 | 200 | 170 | 170 |
| Screw speed (rpm) |  | 45 | 45 | 45 | 45 | 45 |
| Residence time (min) |  | 4.5 | 4.5 | 4.5 | 4.5 | 4.5 |
| Properties of molded articles | Specific gravity | 0.84 | 0.43 | 0.62 | 0.82 | 0.83 |
|  | Expansion ratio | 1.1 | 2.1 | 1.5 | 1.1 | 1.1 |
|  | Mean diameter of pores in molded articles (μm) | — | 128 | 107 | 43 | 45 |
|  | Surface state | D | C | D | C | C |
|  | Molding stability | C | C | C | B | B |

Example of Production 2-1

A premix was prepared by melting and kneading 2.8 kg of the base resin (2) (Ultrasen 720, ethylene-vinyl acetate copolymer, specific gravity 0.947, melting point 67° C., produced by Tosoh Corporation) in a 10-liter pressure kneader, adding 4.2 kg of the microspheres produced in Example of production 1 when the kneading temperature reached 80° C., and mixing uniformly.

Then the resultant premix was fed to the hopper of a double screw extruder with a barrel of 40 mm in diameter and extruded into a strand of 2.0 to 4.0 mm in diameter at the extrusion temperature of 70° C. The resultant strand was cut into 2.0 to 4.0 mm long to be pelletized into a masterbatch (MB1). The properties of the resultant masterbatch are shown in Table 6.

Examples of Production 2-2 to 2-15 and
Comparative Examples of Production 2-1 to 2-5

The MBs 2 to 20 were produced in Examples of production 2-2 to 2-15 and Comparative examples of production 2-1 to 2-5 in the same manner as that in Example of production 2-1 except that the composition and preparation of the masterbatches were changed as shown in Tables 6 and 7. The properties of the masterbatches were measured/evaluated and are shown in Tables 6 and 7.

TABLE 6

|  |  | Examples of production | | | | |
| --- | --- | --- | --- | --- | --- | --- |
|  |  | 2-1 | 2-2 | 2-3 | 2-4 | 2-5 |
| Name of masterbatch |  | MB1 | MB2 | MB3 | MB4 | MB5 |
| Masterbatch composition | Heat-expandable microspheres | Heat-expandable microsphere 1 | Heat-expandable microsphere 2 | Heat-expandable microsphere 3 | Heat-expandable microsphere 4 | Heat-expandable microsphere 5 |
|  | Base resin | Base resin (2) | Base resin (3) | Base resin (4) | Base resin (2) | Base resin (2) |
|  | Amount of base resin (kg) | 2.8 | 3.5 | 3.8 | 4.2 | 2.1 |
|  | Amount of Heat-expandable microsphere (kg) | 4.2 | 3.5 | 3.2 | 2.8 | 4.9 |

TABLE 6-continued

|  |  |  |  |  |  |  |
|---|---|---|---|---|---|---|
|  | Percentage of Heat-expandable microsphere (wt %) | 60.0 | 50.0 | 45.7 | 40.0 | 70.0 |
|  | Amount of Heat-expandable microsphere to 100 parts by weight of base resin (parts by weight) | 150 | 100 | 84.2 | 66.7 | 233 |
| Preparation conditions | Kneading temp. (° C.) | 80 | 90 | 95 | 80 | 80 |
|  | Extrusion temp. (° C.) | 70 | 83 | 85 | 70 | 70 |
| Properties of masterbatch | Specific gravity | 0.94 | 0.92 | 0.92 | 0.93 | 0.95 |
|  | Expansion ratio of formed articles (E2max) | 43 | 54 | 35 | 62 | 59 |
|  | Preparation stability | A | A | A | A | A |

|  |  | Examples of production | | | | |
|---|---|---|---|---|---|---|
|  |  | 2-6 | 2-7 | 2-8 | 2-9 | 2-10 |
| Name of masterbatch |  | MB6 | MB7 | MB8 | MB9 | MB10 |
| Masterbatch composition | Heat-expandable microspheres | Heat-expandable microsphere 6 | Heat-expandable microsphere 7 | Heat-expandable microsphere 8 | Heat-expandable microsphere 9 | Heat-expandable microsphere 10 |
|  | Base resin | Base resin (3) | Base resin (4) | Base resin (2) | Base resin (2) | Base resin (2) |
|  | Amount of base resin (kg) | 2.5 | 3.5 | 3.1 | 3.8 | 3.5 |
|  | Amount of Heat-expandable microsphere (kg) | 4.5 | 3.5 | 3.9 | 3.2 | 3.5 |
|  | Percentage of Heat-expandable microsphere (wt %) | 64.3 | 50.0 | 55.7 | 45.7 | 50.0 |
|  | Amount of Heat-expandable microsphere to 100 parts by weight of base resin (parts by weight) | 180 | 100 | 126 | 84.2 | 100 |
| Preparation conditions | Kneading temp. (° C.) | 90 | 95 | 80 | 80 | 80 |
|  | Extrusion temp. (° C.) | 83 | 85 | 70 | 70 | 70 |
| Properties of masterbatch | Specific gravity | 0.93 | 0.91 | 0.92 | 0.91 | 0.91 |
|  | Expansion ratio of formed articles (E2max) | 44 | 40 | 71 | 26 | 26 |
|  | Preparation stability | A | A | A | A | A |

TABLE 7

|  |  | Examples of production | | | | |
|---|---|---|---|---|---|---|
|  |  | 2-11 | 2-12 | 2-13 | 2-14 | 2-15 |
| Name of masterbatch |  | MB11 | MB12 | MB13 | MB14 | MB15 |
| Masterbatch composition | Heat-expandable microspheres | Heat-expandable microsphere 11 | Heat-expandable microsphere 12 | Heat-expandable microsphere 13 | Heat-expandable microsphere 14 | Heat-expandable microsphere 15 |
|  | Base resin | Base resin (3) | Base resin (4) | Base resin (2) | Base resin (2) | Base resin (3) |
|  | Amount of base resin (kg) | 3.1 | 3.5 | 3.8 | 3.1 | 3.5 |
|  | Amount of Heat-expandable microsphere (kg) | 3.9 | 3.5 | 3.2 | 3.9 | 3.5 |
|  | Percentage of Heat-expandable microsphere (wt %) | 55.7 | 50.0 | 45.7 | 55.7 | 50.0 |
|  | Amount of Heat-expandable microsphere to 100 parts by weight of base resin (parts by weight) | 126 | 100 | 84.2 | 126 | 100 |
| Preparation conditions | Kneading temp. (° C.) | 90 | 95 | 80 | 80 | 90 |
|  | Extrusion temp. (° C.) | 83 | 85 | 70 | 70 | 83 |
| Properties of masterbatch | Specific gravity | 0.93 | 0.91 | 0.90 | 0.91 | 0.92 |
|  | Expansion ratio of formed articles (E2max) | 36 | 29 | 47 | 61 | 44 |
|  | Preparation stability | A | A | A | A | A |

TABLE 7-continued

|  |  | Comparative examples of production | | | | |
|---|---|---|---|---|---|---|
|  |  | 2-1 | 2-2 | 2-3 | 2-4 | 2-5 |
| Name of masterbatch | | MB16 | MB17 | MB18 | MB19 | MB20 |
| Masterbatch composition | Heat-expandable microspheres | Heat-expandable microsphere 16 | Heat-expandable microsphere 17 | Heat-expandable microsphere 18 | Heat-expandable microsphere 19 | Heat-expandable microsphere 20 |
|  | Base resin | Base resin (3) | Base resin (2) | Base resin (4) | Base resin (3) | Base resin (2) |
|  | Amount of base resin (kg) | 3.5 | 3.1 | 3.5 | 4.2 | 3.1 |
|  | Amount of Heat-expandable microsphere (kg) | 3.5 | 3.9 | 3.5 | 2.8 | 3.9 |
|  | Percentage of Heat-expandable microsphere (wt %) | 50.0 | 55.7 | 50.0 | 40.0 | 55.7 |
|  | Amount of Heat-expandable microsphere to 100 parts by weight of base resin (parts by weight) | 100 | 126 | 100 | 66.7 | 126 |
| Preparation conditions | Kneading temp. (° C.) | 90 | 80 | 95 | 90 | 80 |
|  | Extrusion temp. (° C.) | 83 | 70 | 85 | 83 | 70 |
| Properties of masterbatch | Specific gravity | 0.61 | 0.93 | 0.92 | 0.73 | 0.71 |
|  | Expansion ratio of formed articles (E2max) | 20 | 58 | 40 | 7 | 7 |
|  | Preparation stability | C | A | A | B | B |

Example of Production 2-16

A premix was prepared by kneading 100 parts by weight of an ethylene-propylene-unconjugated diene copolymer rubber (EPDM) having 40 Mooney viscosity ML (1+4) at 100° C. measured according to JIS K6300, 300 parts by weight of the microspheres 2 and 100 parts by weight of a process oil in a pressure kneader until the kneading temperature reached 75° C.

Then the resultant premix was fed to the hopper of a single screw extruder with a barrel of 40 mm in diameter and extruded into a strand of 3.0 to 5.5 mm in diameter at the extrusion temperature of 80° C. The resultant strand was cut into 2.0 to 4.0 mm long to be pelletized into a masterbatch (MB21). The true specific gravity of the masterbatch was 0.95 and the expansion ratio ($E2_{max}$) of the resultant molded article was 60 times. The masterbatch was prepared stably.

Example of Production 2-17

A premix was prepared by kneading 100 parts by weight of an ethylene-propylene-unconjugated diene copolymer rubber (EPDM) having 40 Mooney viscosity ML (1+4) at 100° C. measured according to JIS K6300, 250 parts by weight of the microspheres 11 and 100 parts by weight of a process oil in a pressure kneader until the kneading temperature reached 75° C.

Then the resultant premix was fed to the hopper of a single screw extruder with a barrel of 40 mm in diameter and extruded into a strand of 3.0 to 5.5 mm in diameter at the extrusion temperature of 80° C. The resultant strand was cut into 2.0 to 4.0 mm long to be pelletized into a masterbatch (MB22). The true specific gravity of the masterbatch was 0.93 and the expansion ratio ($E2_{max}$) of the resultant molded article was 40 times. The masterbatch was prepared stably.

Example of Production 2-18

A premix was prepared by kneading 100 parts by weight of an ethylene-propylene-unconjugated diene copolymer rubber (EPDM) having 40 Mooney viscosity ML (1+4) at 100° C. measured according to JIS K6300, 300 parts by weight of the microspheres 15 and 100 parts by weight of a process oil in a pressure kneader until the kneading temperature reached 75° C.

Then the resultant premix was fed to the hopper of a single screw extruder with a barrel of 40 mm in diameter and extruded into a strand of 3.0 to 5.5 mm in diameter at the extrusion temperature of 80° C. The resultant strand was cut into 2.0 to 4.0 mm long to be pelletized into a masterbatch (MB23). The true specific gravity of the masterbatch was 0.95 and the expansion ratio ($E2_{max}$) of the resultant molded article was 53 times. The masterbatch was prepared stably.

Example 2-1

A resin composition was prepared by mixing 100 parts by weight of a matrix resin (the base resin (5)) (Santoprene 8201-60, an olefin elastomer, specific gravity 0.95, produced by Exxon Mobil Corporation) and 5 parts by weight of MB1 with a ribbon mixer.

The resultant resin composition was fed to the hopper of an extruder (Lab Plastomill ME-25, a single screw extruder, manufactured by Toyo Seiki Seisaku-sho, Ltd.). The resin composition was melted and kneaded in the barrel at a screw speed of 45 rpm (to adjust the residence time to 4 minutes) by adjusting the temperature of the kneaded mixture at 185° C. and extruded into a strand-formed molded article (3.0 mm in diameter) through a strand die (with a nozzle of 3.0 mm in diameter) the temperature of which was adjusted at 185° C.

The properties of the molded article, i.e., specific gravity, expansion ratio, the mean diameter of the pores in the molded article and surface state, and molding stability were evaluated. The results are shown in Table 8.

Examples 2-2 to 2-22 and Comparative Examples 2-1 to 2-4

The resin compositions and molded articles in Examples 2-2 to 2-22 and Comparative examples 2-1 to 2-4 were prepared or manufactured in the same manner as that in Example 2-1 except that the ingredients of the compositions, molding temperature and screw speed were changed as shown in Tables 8 to 10. The properties of the molded articles, i.e., specific gravity, expansion ratio, the mean diameter of the pores in the molded articles and surface state, and molding stability were evaluated. The results are shown in Tables 8 to 10.

TABLE 8

| | | Examples | | | | |
|---|---|---|---|---|---|---|
| | | 2-1 | 2-2 | 2-3 | 2-4 | 2-5 |
| Resin composition | Masterbatch | MB1 | MB2 | MB3 | MB4 | MB5 |
| | Heat-expandable microspheres | Heat-expandable microsphere 1 | Heat-expandable microsphere 2 | Heat-expandable microsphere 3 | Heat-expandable microsphere 4 | Heat-expandable microsphere 5 |
| | Matrix resin | Base resin (5) | Base resin (5) | Base resin (5) | Base resin (5) | Base resin (5) |
| | Amount of masterbatch (parts by weight) | 5 | 6 | 6.7 | 7.5 | 4.3 |
| | Amount of Heat-expandable microsphere (parts by weight) | 3 | 3 | 3 | 3 | 3 |
| | Amount of Heat-expandable microsphere to 100 pats by weight of all base resins (pars by weight) | 2.9 | 2.9 | 2.9 | 2.9 | 3.0 |
| Molding temp. (° C.) | | 185 | 180 | 195 | 180 | 190 |
| Screw speed (rpm) | | 45 | 45 | 45 | 45 | 45 |
| Residence time (min) | | 4 | 4 | 4 | 4 | 4 |
| Properties of molded articles | Specific gravity | 0.46 | 0.42 | 0.55 | 0.38 | 0.43 |
| | Expansion ratio | 2.1 | 2.3 | 1.8 | 2.6 | 2.3 |
| | Mean diameter of pores in molded articles (μm) | 94 | 124 | 82 | 175 | 101 |
| | Surface state | A | A | A | B | A |
| | Molding stability | A | A | A | A | A |

| | | Examples | | | | |
|---|---|---|---|---|---|---|
| | | 2-6 | 2-7 | 2-8 | 2-9 | 2-10 |
| Resin composition | Masterbatch | MB6 | MB6 | MB6 | MB7 | MB8 |
| | Heat-expandable microspheres | Heat-expandable microsphere 6 | Heat-expandable microsphere 6 | Heat-expandable microsphere 6 | Heat-expandable microsphere 7 | Heat-expandable microsphere 8 |
| | Matrix resin | Base resin (5) | Base resin (5) | Base resin (5) | Base resin (5) | Base resin (5) |
| | Amount of masterbatch (parts by weight) | 4.6 | 4.6 | 4.6 | 6 | 5.5 |
| | Amount of Heat-expandable microsphere (parts by weight) | 3 | 3 | 3 | 3 | 3 |
| | Amount of Heat-expandable microsphere to 100 pats by weight of all base resins (pars by weight) | 3.0 | 3.0 | 3.0 | 2.9 | 2.9 |
| Molding temp. (° C.) | | 185 | 180 | 175 | 180 | 180 |
| Screw speed (rpm) | | 45 | 35 | 25 | 45 | 45 |
| Residence time (min) | | 4 | 7 | 11 | 4 | 4 |
| Properties of molded articles | Specific gravity | 0.50 | 0.52 | 0.55 | 0.58 | 0.41 |
| | Expansion ratio | 1.9 | 1.9 | 1.8 | 1.7 | 2.4 |
| | Mean diameter of pores in molded articles (μm) | 90 | 88 | 81 | 82 | 156 |
| | Surface state | A | A | A | A | B |
| | Molding stability | A | A | A | A | A |

TABLE 9

| | | Examples | | | | |
|---|---|---|---|---|---|---|
| | | 2-11 | 2-12 | 2-13 | 2-14 | 2-15 |
| Resin composition | Masterbatch | MB9 | MB10 | MB11 | MB12 | MB13 |
| | Heat-expandable microspheres | Heat-expandable microsphere 9 | Heat-expandable microsphere 10 | Heat-expandable microsphere 11 | Heat-expandable microsphere 12 | Heat-expandable microsphere 13 |
| | Matrix resin | Base resin (5) | Base resin (5) | Base resin (5) | Base resin (5) | Base resin (5) |
| | Amount of masterbatch (parts by weight) | 6 | 6.7 | 5.5 | 6 | 6.7 |
| | Amount of Heat-expandable microsphere (parts by weight) | 3 | 3 | 3 | 3 | 3 |
| | Amount of Heat-expandable microsphere to 100 parts by weight of all base resins (parts by weight) | 2.9 | 2.9 | 2.9 | 2.9 | 2.9 |

TABLE 9-continued

|  |  |  |  |  |  |  |
|---|---|---|---|---|---|---|
| Molding temp. (° C.) |  | 180 | 180 | 185 | 185 | 180 |
| Screw speed (rpm) |  | 45 | 45 | 45 | 45 | 45 |
| Residence time (min) |  | 4 | 4 | 4 | 4 | 4 |
| Properties of molded articles | Specific gravity | 0.64 | 0.67 | 0.49 | 0.56 | 0.51 |
|  | Expansion ratio | 1.5 | 1.4 | 2.0 | 1.7 | 1.9 |
|  | Mean diameter of pores in molded articles (μm) | 70 | 52 | 87 | 73 | 120 |
|  | Surface state | A | A | A | A | B |
|  | Molding stability | A | A | A | A | A |

|  |  | Examples | | | | |
|---|---|---|---|---|---|---|
|  |  | 2-16 | 2-17 | 2-18 | 2-19 | 2-20 |
| Resin composition | Masterbatch | MB14 | MB15 | MB2 | MB6 | MB21 |
|  | Heat-expandable microspheres | Heat-expandable microsphere 14 | Heat-expandable microsphere 15 | Heat-expandable microsphere 2 | Heat-expandable microsphere 6 | Heat-expandable microsphere 2 |
|  | Matrix resin | Base resin (5) | Base resin (5) | Base resin (5) | Base resin (5) | Base resin (5) |
|  | Amount of masterbatch (parts by weight) | 5.5 | 6 | 12 | 18.5 | 5 |
|  | Amount of Heat-expandable microsphere (parts by weight) | 3 | 3 | 6 | 10 | 3 |
|  | Amount of Heat-expandable microsphere to 100 parts by weight of all base resins (parts by weight) | 2.9 | 2.9 | 5.7 | 9.2 | 3.0 |
| Molding temp. (° C.) |  | 185 | 185 | 185 | 180 | 180 |
| Screw speed (rpm) |  | 45 | 45 | 45 | 45 | 45 |
| Residence time (min) |  | 4 | 4 | 4 | 4 | 4 |
| Properties of molded articles | Specific gravity | 0.48 | 0.47 | 0.34 | 0.41 | 0.43 |
|  | Expansion ratio | 2.0 | 2.1 | 2.9 | 2.4 | 2.3 |
|  | Mean diameter of pores in molded articles (μm) | 107 | 99 | 119 | 85 | 120 |
|  | Surface state | A | A | A | A | A |
|  | Molding stability | A | A | A | A | A |

TABLE 10

|  |  | Examples | | Comparative examples |
|---|---|---|---|---|
|  |  | 2-21 | 2-22 | 2-1 |
| Resin composition | Masterbatch | MB22 | MB23 | MB17 |
|  | Heat-expandable microspheres | Heat-expandable microsphere 11 | Heat-expandable microsphere 15 | Heat-expandable microsphere 17 |
|  | Matrix resin | Base resin (5) | Base resin (5) | Base resin (5) |
|  | Amount of masterbatch (parts by weight) | 5.4 | 5 | 5.5 |
|  | Amount of Heat-expandable microsphere (parts by weight) | 3 | 3 | 3 |
|  | Amount of Heat-expandable microsphere to 100 parts by weight of all base resins (parts by weight) | 3.0 | 2.9 | 2.9 |
| Molding temp. (° C.) |  | 185 | 185 | 200 |
| Screw speed (rpm) |  | 45 | 45 | 45 |
| Residence time (min) |  | 4 | 4 | 4 |
| Properties of molded articles | Specific gravity | 0.49 | 0.47 | 0.40 |
|  | Expansion ratio | 2.0 | 2.1 | 2.4 |
|  | Mean diameter of pores in molded articles (μm) | 100 | 98 | 118 |
|  | Surface state | A | A | C |
|  | Molding stability | A | A | B |

|  |  | Comparative examples | | |
|---|---|---|---|---|
|  |  | 2-2 | 2-3 | 2-4 |
| Resin composition | Masterbatch | MB18 | MB19 | MB20 |
|  | Heat-expandable microspheres | Heat-expandable microsphere 18 | Heat-expandable microsphere 19 | Heat-expandable microsphere 20 |
|  | Matrix resin | Base resin (5) | Base resin (5) | Base resin (5) |
|  | Amount of masterbatch (parts by weight) | 6 | 7.5 | 5.5 |
|  | Amount of Heat-expandable microsphere (parts by weight) | 3 | 3 | 3 |

TABLE 10-continued

|  |  |  |  |  |
|---|---|---|---|---|
|  | Amount of Heat-expandable microsphere to 100 parts by weight of all base resins (parts by weight) | 2.9 | 2.9 | 2.9 |
| Molding temp. (° C.) |  | 200 | 170 | 170 |
| Screw speed (rpm) |  | 45 | 45 | 45 |
| Residence time (min) |  | 4 | 4 | 4 |
| Properties of molded articles | Specific gravity | 0.48 | 0.92 | 0.89 |
|  | Expansion ratio | 2.0 | 1.1 | 1.1 |
|  | Mean diameter of pores in molded articles (μm) | 98 | 40 | 40 |
|  | Surface state | D | C | C |
|  | Molding stability | C | B | B |

Example 3-1

A resin composition was prepared by mixing 100 parts by weight of a matrix resin (the base resin (6)) (NOVATEC HD HE121, a high-density polyethylene, specific gravity 0.938, melting point 127° C., produced by Japan Polyethylene Corporation) and 5 parts by weight of MB1 with a ribbon mixer.

The resin composition was fed to the hopper of an extruder (Lab Plastomill ME-25, a single screw extruder, manufactured by Toyo Seiki Seisaku-sho, Ltd.). The resin composition was melted and kneaded in the barrel at a screw speed of 45 rpm (to adjust the residence time to 5 minutes) by adjusting the temperature of the kneaded mixture at 180° C. and extruded into a strand-formed molded article (of 3.0 mm in diameter) through a strand die (with a nozzle of 3.0 mm in diameter) the temperature of which was adjusted at 180° C.

The properties of the molded article, i.e., specific gravity, expansion ratio, the mean diameter of the pores in the molded article and surface state, and molding stability were evaluated. The results are shown in Table 11.

Examples 3-2 to 3-19 and Comparative Examples 3-1 to 3-4

Resin compositions and molded articles in Examples 3-2 to 3-19 and Comparative examples 3-1 to 3-4 were prepared in the same manner as that in Example 3-1 except that the ingredients of the compositions, molding temperature and screw speed were changed as shown in Tables 11 to 13. The properties of the molded articles, i.e., specific gravity, expansion ratio, the mean diameter of the pores in the molded articles and surface state, and molding stability were evaluated. The results are shown in Tables 11 to 13.

TABLE 11

|  |  | Examples | | | |
|---|---|---|---|---|---|
|  |  | 3-1 | 3-2 | 3-3 | 3-4 |
| Resin composition | Masterbatch | MB1 | MB2 | MB3 | MB4 |
|  | Heat-expandable microspheres | Heat-expandable microsphere 1 | Heat-expandable microsphere 2 | Heat-expandable microsphere 3 | Heat-expandable microsphere 4 |
|  | Matrix resin | Base resin (6) | Base resin (6) | Base resin (6) | Base resin (6) |
|  | Amount of masterbatch (parts by weight) | 5 | 6 | 6.7 | 7.5 |
|  | Amount of Heat-expandable microsphere (parts by weight) | 3 | 3 | 3 | 3 |
|  | Amount of Heat-expandable microsphere to 100 parts by weight of all base resins (parts by weight) | 2.9 | 2.9 | 2.9 | 2.9 |
| Molding temp. (° C.) |  | 180 | 175 | 185 | 175 |
| Screw speed (rpm) |  | 45 | 45 | 45 | 45 |
| Residence time (min) |  | 5 | 5 | 5 | 5 |
| Properties of molded articles | Specific gravity | 0.55 | 0.49 | 0.63 | 0.46 |
|  | Expansion ratio | 1.7 | 1.9 | 1.5 | 2.0 |
|  | Mean diameter of pores in molded articles (μm) | 98 | 125 | 82 | 178 |
|  | Surface state | A | A | A | B |
|  | Molding stability | A | A | A | A |
|  |  | Examples | | | |
|  |  | 3-5 | 3-6 | 3-7 | 3-8 |
| Resin composition | Masterbatch | MB5 | MB5 | MB5 | MB6 |
|  | Heat-expandable microspheres | Heat-expandable microsphere 5 | Heat-expandable microsphere 5 | Heat-expandable microsphere 5 | Heat-expandable microsphere 6 |
|  | Matrix resin | Base resin (6) | Base resin (6) | Base resin (6) | Base resin (6) |
|  | Amount of masterbatch (parts by weight) | 4.3 | 4.3 | 4.3 | 4.6 |
|  | Amount of Heat-expandable microsphere (parts by weight) | 3 | 3 | 3 | 3 |

TABLE 11-continued

|  |  |  |  |  |  |
|---|---|---|---|---|---|
|  | Amount of Heat-expandable microsphere to 100 parts by weight of all base resins (parts by weight) | 3.0 | 3.0 | 3.0 | 3.0 |
| Molding temp. (° C.) |  | 180 | 180 | 175 | 180 |
| Screw speed (rpm) |  | 45 | 35 | 25 | 45 |
| Residence time (min) |  | 5 | 9 | 14 | 5 |
| Properties of molded articles | Specific gravity | 0.50 | 0.54 | 0.57 | 0.58 |
|  | Expansion ratio | 1.9 | 1.7 | 1.6 | 1.6 |
|  | Mean diameter of pores in molded articles (μm) | 104 | 99 | 91 | 85 |
|  | Surface state | A | A | B | A |
|  | Molding stability | A | A | A | A |

TABLE 12

|  |  | Examples | | | |
|---|---|---|---|---|---|
|  |  | 3-9 | 3-10 | 3-11 | 3-12 |
| Resin composition | Masterbatch | MB7 | MB8 | MB9 | MB10 |
|  | Heat-expandable microspheres | Heat-expandable microsphere 7 | Heat-expandable microsphere 8 | Heat-expandable microsphere 9 | Heat-expandable microsphere 10 |
|  | Matrix resin | Base resin (6) | Base resin (6) | Base resin (6) | Base resin (6) |
|  | Amount of masterbatch (parts by weight) | 6 | 5.5 | 6 | 6.7 |
|  | Amount of Heat-expandable microsphere (parts by weight) | 3 | 3 | 3 | 3 |
|  | Amount of Heat-expandable microsphere to 100 parts by weight of all base resins (parts by weight) | 2.9 | 2.9 | 2.9 | 2.9 |
| Molding temp. (° C.) |  | 175 | 175 | 170 | 170 |
| Screw speed (rpm) |  | 45 | 45 | 45 | 45 |
| Residence time (min) |  | 5 | 5 | 5 | 5 |
| Properties of molded articles | Specific gravity | 0.65 | 0.49 | 0.69 | 0.74 |
|  | Expansion ratio | 1.4 | 1.9 | 1.4 | 1.3 |
|  | Mean diameter of pores in molded articles (μm) | 75 | 147 | 63 | 46 |
|  | Surface state | A | B | A | A |
|  | Molding stability | A | A | A | A |

|  |  | Examples | | | |
|---|---|---|---|---|---|
|  |  | 3-13 | 3-14 | 3-15 | 3-16 |
| Resin composition | Masterbatch | MB11 | MB12 | MB13 | MB14 |
|  | Heat-expandable microspheres | Heat-expandable microsphere 11 | Heat-expandable microsphere 12 | Heat-expandable microsphere 13 | Heat-expandable microsphere 14 |
|  | Matrix resin | Base resin (6) | Base resin (6) | Base resin (6) | Base resin (6) |
|  | Amount of masterbatch (parts by weight) | 5.5 | 6 | 6.7 | 5.5 |
|  | Amount of Heat-expandable microsphere (parts by weight) | 3 | 3 | 3 | 3 |
|  | Amount of Heat-expandable microsphere to 100 parts by weight of all base resins (parts by weight) | 2.9 | 2.9 | 2.9 | 2.9 |
| Molding temp. (° C.) |  | 180 | 180 | 170 | 180 |
| Screw speed (rpm) |  | 45 | 45 | 45 | 45 |
| Residence time (min) |  | 5 | 5 | 5 | 5 |
| Properties of molded articles | Specific gravity | 0.59 | 0.63 | 0.60 | 0.58 |
|  | Expansion ratio | 1.6 | 1.5 | 1.6 | 1.6 |
|  | Mean diameter of pores in molded articles (μm) | 80 | 71 | 110 | 101 |
|  | Surface state | A | A | B | A |
|  | Molding stability | A | A | A | A |

TABLE 13

|  |  | Examples | | | Comparative examples |
| --- | --- | --- | --- | --- | --- |
|  |  | 3-17 | 3-18 | 3-19 | 3-1 |
| Resin composition | Masterbatch | MB15 | MB3 | MB8 | MB17 |
|  | Heat-expandable microspheres | Heat-expandable microsphere 15 | Heat-expandable microsphere 3 | Heat-expandable microsphere 8 | Heat-expandable microsphere 17 |
|  | Matrix resin | Base resin (6) | Base resin (6) | Base resin (6) | Base resin (6) |
|  | Amount of masterbatch (parts by weight) | 6 | 13.3 | 20 | 5.5 |
|  | Amount of Heat-expandable microsphere (parts by weight) | 3 | 6 | 11 | 3 |
|  | Amount of Heat-expandable microsphere to 100 parts by weight of all base resins (parts by weight) | 2.9 | 5.6 | 10.1 | 2.9 |
| Molding temp. (° C.) |  | 180 | 185 | 175 | 190 |
| Screw speed (rpm) |  | 45 | 45 | 45 | 45 |
| Residence time (min) |  | 5 | 5 | 5 | 5 |
| Properties of molded articles | Specific gravity | 0.55 | 0.57 | 0.39 | 0.53 |
|  | Expansion ratio | 1.7 | 1.6 | 2.4 | 1.8 |
|  | Mean diameter of pores in molded articles (μm) | 98 | 80 | 141 | 118 |
|  | Surface state | A | A | A | C |
|  | Molding stability | A | A | A | B |

|  |  | Comparative examples | | |
| --- | --- | --- | --- | --- |
|  |  | 3-2 | 3-3 | 3-4 |
| Resin composition | Masterbatch | MB18 | MB19 | MB20 |
|  | Heat-expandable microspheres | Heat-expandable microsphere 18 | Heat-expandable microsphere 19 | Heat-expandable microsphere 20 |
|  | Matrix resin | Base resin (6) | Base resin (6) | Base resin (6) |
|  | Amount of masterbatch (parts by weight) | 6 | 7.5 | 5.5 |
|  | Amount of Heat-expandable microsphere (parts by weight) | 3 | 3 | 3 |
|  | Amount of Heat-expandable microsphere to 100 parts by weight of all base resins (parts by weight) | 2.9 | 2.9 | 2.9 |
| Molding temp. (° C.) |  | 200 | 170 | 170 |
| Screw speed (rpm) |  | 45 | 45 | 45 |
| Residence time (min) |  | 5 | 5 | 5 |
| Properties of molded articles | Specific gravity | 0.57 | 0.90 | 0.89 |
|  | Expansion ratio | 1.6 | 1.0 | 1.1 |
|  | Mean diameter of pores in molded articles (μm) | 98 | 40 | 40 |
|  | Surface state | D | C | C |
|  | Molding stability | B | B | B |

Example 4-1

Wet-powdery microspheres 1 were prepared by mixing 2.5 parts by weight of the microspheres 1 produced in Example of production 1-1 and 0.3 parts by weight of a process oil with a ribbon mixer.

A resin composition (a premix) was prepared by kneading 100 parts by weight of an ethylene-propylene-unconjugated diene copolymer rubber (EPDM) having Mooney viscosity ML (1+4) of 54 at 100° C. determined according to JIS K6300, 100 parts by weight of calcium carbonate, 30 parts by weight of a process oil, 3 parts by weight of a vulcanization accelerator, Sanceler PZ as a dithiocarbamate vulcanization accelerator and 0.4 parts by weight of sulfur with a Banbury mixer at the kneading temperature of 125° C. for 3 minutes. No expansion was found in the kneaded premix.

Then the resultant premix was fed to the hopper of an extruder, adjusting the temperature of the kneaded material at 125° C., and extruded through the die into a molded product having a prescribed cross section. Then the extruded article was vulcanized at 170° C. for 13 minutes in a vulcanization zone to be processed into a molded article.

The properties of the molded article, i.e., specific gravity, expansion ratio, the mean diameter of the pores in the molded article and surface state, and molding stability were evaluated. The results are shown in Table 14.

Examples 4-2 to 4-15 and Comparative Examples 4-1 to 4-3

Resin compositions and molded articles were prepared and manufactured in the same manner as that in Example 4-1 except that the ingredients of the resin compositions, kneading conditions, molding conditions and vulcanization conditions were changed as shown in Tables 14 and 15. The properties of the molded articles, i.e., specific gravity, expansion ratio, the mean diameter of the pores in the molded articles and surface state, and molding stability were evaluated. The results are shown in Tables 14 and 15. The molded articles manufactured in Examples of production 4-1, 4-4, 4-7, 4-8 and 4-14 and Comparative examples of production 4-1 to 4-3, which were respectively manufactured from the resin compositions containing no microspheres and containing a base resin (EPDM), calcium carbonate, process oil, vulcanization accelerator and sulfur in the amounts shown in Tables 14 and 15, had a specific gravity of 1.4. The molded articles produced in Examples of production other than Examples of production 4-1, 4-4, 4-7, 4-8 and 4-14 and Comparative examples of production 4-1 to 4-3, which were respectively produced from the resin compositions containing no microspheres and containing a base resin, calcium carbonate, process oil, vulcanization accelerator and sulfur in the amounts shown in Tables 14 and 15, had a specific gravity of 1.3. The abbreviations in Tables 14 and 15, EPDM, NR, NBR and CR, respectively indicate ethylene-propylene-unconjugated diene copolymer rubber (EPDM), natural rubber (NR), acrylonitrile butadiene rubber (NBR) and chloroprene rubber (CR).

The kneaded mixtures in Examples of production 4-1 to 4-15, which were kneaded by a Banbury mixer, were not found to have expanded. On the other hand, the kneaded premixes in Comparative examples of production 4-1 to 4-3 were found to have expanded after kneading and the resin compositions extruded by the extruder were found to have a peeled surface.

TABLE 14

| | | | Examples | | |
|---|---|---|---|---|---|
| | | | 4-1 | 4-2 | 4-3 |
| Resin composition | Base resin | Resin type | EPDM | EPDM | EPDM |
| | | Mooney viscosity ML (1 + 4) (100° C.) | 54 | 73 | 42 |
| | | Amount (parts by weight) | 100 | 100 | 100 |
| | Additives | Calcium carbonate (parts by weight) | 100 | 100 | 100 |
| | | Process oil (parts by weight) | 30 | 50 | 50 |
| | | Vulcanization promoter (parts by weight) | 3 | 3 | 3 |
| | | Sulfur (parts by weight) | 0.4 | 0.7 | 0.6 |
| | Wet-powdery microspheres | Wet-powdery heat-expandable microsphere types | Wet-powdery microsphere 1 | Wet-powdery microsphere 2 | Wet-powdery microsphere 3 |
| | | Microspheres | Heat-expandable microshere 1 | Heat-expandable microshere 2 | Heat-expandable microshere 3 |
| | | Amount (parts by weight) | 2.5 | 5.0 | 6.3 |
| | | Liquid compound (process oil) (parts by weight) | 0.3 | 0.4 | 0.5 |
| Kneading | Conditions | Kneading temp. (° C.) | 125 | 125 | 125 |
| | | Kneading time (min) | 3 | 3 | 3 |
| Molding/ vulcanization | | Molding temp. (° C.) | 125 | 125 | 125 |
| | | Vulcanization temp. (° C.) | 170 | 170 | 180 |
| | | Vulcanization time (min) | 13 | 13 | 13 |
| Properties of molded articles | | Specific gravity | 0.76 | 0.55 | 0.52 |
| | | Expansion ratio | 1.8 | 2.4 | 2.5 |
| | | Mean diameter of pores in molded articles (μm) | 100 | 130 | 90 |
| | | Surface state | A | A | A |
| | | Molding stability | A | A | A |

| | | | Examples | | |
|---|---|---|---|---|---|
| | | | 4-4 | 4-5 | 4-6 |
| Resin composition | Base resin | Resin type | EPDM | EPDM | NR |
| | | Mooney viscosity ML (1 + 4) (100° C.) | 54 | 73 | 80 |
| | | Amount (parts by weight) | 100 | 100 | 100 |
| | Additives | Calcium carbonate (parts by weight) | 100 | 100 | 70 |
| | | Process oil (parts by weight) | 30 | 50 | 50 |
| | | Vulcanization promoter (parts by weight) | 3 | 3 | 2 |
| | | Sulfur (parts by weight) | 0.4 | 0.7 | 1 |
| | Wet-powdery microspheres | Wet-powdery heat-expandable microsphere types | — | Wet-powdery microsphere 5 | Wet-powdery microsphere 6 |
| | | Microspheres | Heat-expandable microshere 4 | Heat-expandable microshere 5 | Heat-expandable microshere 6 |
| | | Amount (parts by weight) | 3.8 | 3.8 | 2.5 |
| | | Liquid compound (process oil) (parts by weight) | — | 0.2 | 0.3 |
| Kneading | Conditions | Kneading temp. (° C.) | 125 | 125 | 125 |
| | | Kneading time (min) | 3 | 3 | 3 |
| Molding/ vulcanization | | Molding temp. (° C.) | 125 | 125 | 125 |
| | | Vulcanization temp. (° C.) | 170 | 175 | 170 |
| | | Vulcanization time (min) | 13 | 13 | 13 |

TABLE 14-continued

|  |  |  | | | |
|---|---|---|---|---|---|
| Properties of molded articles | | Specific gravity | 0.59 | 0.72 | 0.80 |
| | | Expansion ratio | 2.4 | 1.8 | 1.6 |
| | | Mean diameter of pores in molded articles (μm) | 178 | 112 | 92 |
| | | Surface state | B | A | A |
| | | Molding stability | A | A | A |

|  |  |  | Examples | | |
|---|---|---|---|---|---|
| | | | 4-7 | 4-8 | 4-9 |
| Resin composition | Base resin | Resin type | EPDM | EPDM | NBR |
| | | Mooney viscosity ML (1 + 4) (100° C.) | 54 | 54 | 30 |
| | | Amount (parts by weight) | 100 | 100 | 100 |
| | Additives | Calcium carbonate (parts by weight) | 100 | 100 | 100 |
| | | Process oil (parts by weight) | 30 | 30 | 60 |
| | | Vulcanization promoter (parts by weight) | 3 | 3 | 3 |
| | | Sulfur (parts by weight) | 0.4 | 0.4 | 0.6 |
| | Wet-powdery microspheres | Wet-powdery heat-expandable microsphere types | Wet-powdery microsphere 7 | Wet-powdery microsphere 8 | Wet-powdery microsphere 9 |
| | | Microspheres | Heat-expandable microshere 7 | Heat-expandable microshere 8 | Heat-expandable microshere 9 |
| | | Amount (parts by weight) | 7.5 | 6.3 | 7.5 |
| | | Liquid compound (process oil) (parts by weight) | 1.0 | 0.5 | 0.9 |
| Kneading | Conditions | Kneading temp. (° C.) | 125 | 125 | 125 |
| | | Kneading time (min) | 3 | 3 | 3 |
| Molding/ vulcanization | | Molding temp. (° C.) | 125 | 125 | 125 |
| | | Vulcanization temp. (° C.) | 170 | 170 | 165 |
| | | Vulcanization time (min) | 13 | 13 | 13 |
| Properties of molded articles | | Specific gravity | 0.62 | 0.49 | 0.72 |
| | | Expansion ratio | 2.3 | 2.9 | 1.8 |
| | | Mean diameter of pores in molded articles (μm) | 85 | 160 | 76 |
| | | Surface state | A | B | A |
| | | Molding stability | A | A | A |

TABLE 15

|  |  |  | Examples | | |
|---|---|---|---|---|---|
| | | | 4-10 | 4-11 | 4-12 |
| Resin composition | Base resin | Resin type | EPDM | CR | EPDM |
| | | Mooney viscosity ML (1 + 4) (100° C.) | 42 | 61 | 73 |
| | | Amount (parts by weight) | 100 | 100 | 100 |
| | Additives | Calcium carbonate (parts by weight) | 100 | 100 | 100 |
| | | Process oil (parts by weight) | 50 | 50 | 50 |
| | | Vulcanization promoter (parts by weight) | 3 | 2 | 3 |
| | | Sulfur (parts by weight) | 0.6 | 0.8 | 0.7 |
| | Wet-powdery microspheres | Wet-powdery heat-expandable microshere types | Wet-powdery microsphere 10 | — | Wet-powdery microsphere 12 |
| | | Microspheres | Heat-expandable microshere 10 | Heat-expandable microshere 11 | Heat-expandable microshere 12 |
| | | Amount (parts by weight) | 5.0 | 3.8 | 3.8 |
| | | Liquid compound (process oil) (parts by weight) | 1.5 | — | 0.4 |
| Kneading | Conditions | Kneading temp. (° C.) | 125 | 125 | 125 |
| | | Kneading time (min) | 3 | 3 | 3 |
| Molding/ vulcanization | | Molding temp. (° C.) | 125 | 125 | 125 |
| | | Vulcanization temp. (° C.) | 165 | 170 | 175 |
| | | Vulcanization time (min) | 13 | 13 | 13 |

TABLE 15-continued

| | | | | | |
|---|---|---|---|---|---|
| Properties of molded articles | Specific gravity | | 0.83 | 0.74 | 0.75 |
| | Expansion ratio | | 1.6 | 1.8 | 1.7 |
| | Mean diameter of pores in molded articles (μm) | | 54 | 91 | 84 |
| | Surface state | | A | B | A |
| | Molding stability | | A | A | A |

| | | | Examples | | |
|---|---|---|---|---|---|
| | | | 4-13 | 4-14 | 4-15 |
| Resin composition | Base resin | Resin type | EPDM | EPDM | EPDM |
| | | Mooney viscosity ML (1 + 4) (100° C.) | 42 | 54 | 73 |
| | | Amount (parts by weight) | 100 | 100 | 100 |
| | Additives | Calcium carbonate (parts by weight) | 100 | 100 | 100 |
| | | Process oil (parts by weight) | 50 | 30 | 50 |
| | | Vulcanization promoter (parts by weight) | 3 | 3 | 3 |
| | | Sulfur (parts by weight) | 0.6 | 0.4 | 0.7 |
| | Wet-powdery microspheres | Wet-powdery heat-expandable microshere types | Wet-powdery microsphere 13 | Wet-powdery microsphere 14 | Wet-powdery microsphere 15 |
| | | Microspheres | Heat-expandable microshere 13 | Heat-expandable microshere 14 | Heat-expandable microshere 15 |
| | | Amount (parts by weight) | 2.5 | 3.8 | 3.8 |
| | | Liquid compound (process oil) (parts by weight) | 0.3 | 0.5 | 0.4 |
| Kneading | Conditions | Kneading temp. (° C.) | 125 | 125 | 125 |
| | | Kneading time (min) | 3 | 3 | 3 |
| Molding/ vulcanization | Molding temp. (° C.) | | 125 | 125 | 125 |
| | Vulcanization temp. (° C.) | | 165 | 170 | 170 |
| | Vulcanization time (min) | | 13 | 13 | 13 |
| Properties of molded articles | Specific gravity | | 0.73 | 0.67 | 0.70 |
| | Expansion ratio | | 1.8 | 2.1 | 1.9 |
| | Mean diameter of pores in molded articles (μm) | | 114 | 110 | 105 |
| | Surface state | | B | A | A |
| | Molding stability | | A | A | A |

| | | | Comparative examples | | |
|---|---|---|---|---|---|
| | | | 4-1 | 4-2 | 4-3 |
| Resin composition | Base resin | Resin type | EPDM | EPDM | EPDM |
| | | Mooney viscosity ML (1 + 4) (100° C.) | 54 | 54 | 54 |
| | | Amount (parts by weight) | 100 | 100 | 100 |
| | Additives | Calcium carbonate (parts by weight) | 100 | 100 | 100 |
| | | Process oil (parts by weight) | 30 | 30 | 30 |
| | | Vulcanization promoter (parts by weight) | 3 | 3 | 3 |
| | | Sulfur (parts by weight) | 0.6 | 0.6 | 0.6 |
| | Wet-powdery microspheres | Wet-powdery heat-expandable microshere types | Wet-powdery microsphere 16 | Wet-powdery microsphere 19 | — |
| | | Microspheres | Heat-expandable microshere 16 | Heat-expandable microshere 19 | Heat-expandable microshere 20 |
| | | Amount (parts by weight) | 3.8 | 3.8 | 3.8 |
| | | Liquid compound (process oil) (parts by weight) | 0.4 | 0.4 | — |
| Kneading | Conditions | Kneading temp. (° C.) | 125 | 125 | 125 |
| | | Kneading time (min) | 3 | 3 | 3 |
| Molding/ vulcanization | Molding temp. (° C.) | | 125 | 125 | 125 |
| | Vulcanization temp. (° C.) | | 160 | 160 | 160 |
| | Vulcanization time (min) | | 13 | 13 | 13 |
| Properties of molded articles | Specific gravity | | 1.30 | 1.20 | 1.20 |
| | Expansion ratio | | 1.1 | 1.2 | 1.2 |
| | Mean diameter of pores in molded articles (μm) | | 41 | 49 | 50 |
| | Surface state | | D | D | D |
| | Molding stability | | B | B | B |

Some of the compounds in Tables 1 to 15 are represented by the abbreviations shown in Table 16.

TABLE 16

| Abbreviation | Compound |
| --- | --- |
| PVP | Polyvinyl pyrolidone |
| EDTA | Ethylenediaminetetraaceticacid tetrasodiumsalt |
| Base resin (1) | Styrene elastomer (AR-SC-65, specific gravity 0.90, softening point 66° C., produced by Aronkasei Co., Ltd.) |
| Base resin (2) | Ethylene vinyl-acetate copolymer (Ultrasen 720, specific gravity 0.947, melting point 67° C., produced by Tosoh Corporation) |
| Base resin (3) | Low density polyethylene (Excellen FX558, specific gravity 0.89, melting point 79° C., produced by Sumitomo Chemical Co., Ltd.) |
| Base resin (4) | Polypropylene (L-MODU S600, specific gravity 0.87, melting point 80° C., produced by Idemitsu Kosan Co., Ltd. |
| Base resin (5) | Olefin elastomer (Santoprene 8201-60, specific gravity 0.95, produced by Exxon Mobil Corporation) |
| Base resin (6) | High density polyethylene (NOVATEC HD HE121, specific gravity 0.938, melting point 127° C., produced by Japan Polyethylene Corporation |

Figure 2:
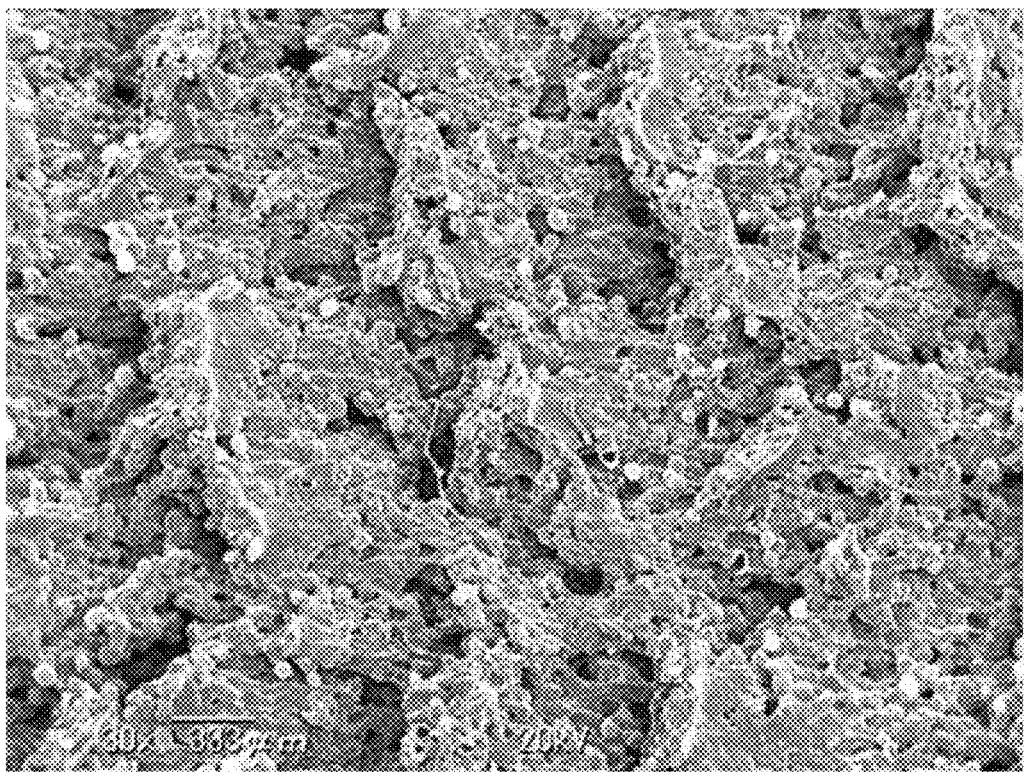
FIG. 2 is an electron micrograph showing the surface of the molded article manufactured in Comparative example 2-2.

As shown in Tables 3, 4 and 8 to 15, the molded articles manufactured in Examples, which comprise heat-expandable microspheres comprising a thermoplastic resin shell produced from a resin composition that was a polymer of a polymerizable component containing N-substituted maleimide and nitrile monomer essentially containing methacrylonitrile, have minimum peeled surface (refer to FIG. 1). On the other hand, the molded articles manufactured in Comparative examples, which comprise heat-expandable microspheres comprising a thermoplastic resin shell produced from a resin composition that was a polymer of a polymerizable component containing no N-substituted maleimide and no nitrile monomer essentially containing methacrylonitrile, have peeled surface (refer to FIG. 2).

In addition, the molded articles manufactured in Examples, which comprise heat-expandable microspheres comprising a thermoplastic resin shell produced from a resin composition that was a polymer of a polymerizable component containing N-substituted maleimide and nitrile monomer essentially containing methacrylonitrile, have been found to have a high expansion ratio and can be molded stably.

INDUSTRIAL APPLICABILITY

The resin composition of the present invention can be manufactured into molded articles that are preferable for various end uses including automotive parts; electric and electronic parts; civil engineering and construction parts; rollers for office automation equipment and industrial rollers.

The invention has been described in detail with reference to the above embodiments. However, the invention should not be construed as being limited thereto. It should further be apparent to those skilled in the art that various changes in form and detail of the invention as shown and described above may be made. It is intended that such changes be included within the spirit and scope of the invention.

The invention claimed is:

1. A resin composition comprising at least one base resin selected from rubbers, olefin resins and thermoplastic elastomers and heat-expandable microspheres;
   wherein the heat-expandable microspheres comprise a thermoplastic resin shell and a thermally vaporizable blowing agent encapsulated therein;
   the thermoplastic resin is a polymer of a polymerizable component containing N-substituted maleimide and a nitrile monomer containing methacrylonitrile,
   the total amount of N-substituted maleimide and methacrylonitrile in the polymerizable component ranges from 8 to 50 wt %, and
   the polymerizable component satisfies condition 1 below,
   condition 1: the amounts of the methacrylonitrile and N-substituted maleimide in the polymerizable component are represented by the following formula (I):

$$7 \geq \text{amount of N-substituted maleimide/amount of methacrylonitrile} \geq 0.5 \quad \text{Formula (I).}$$

2. The resin composition as claimed in claim 1, wherein the thermoplastic elastomer comprises an olefin elastomer.

3. The resin composition as claimed in claim 1, wherein the blowing agent contains a hydrocarbon having 8 carbon atoms.

4. The resin composition as claimed in claim 3, wherein the blowing agent further contains at least one hydrocarbon selected from hydrocarbons having 4 to 7 carbon atoms.

5. The resin composition as claimed in claim 4, wherein the blowing agent further contains at least one hydrocarbon selected from hydrocarbons having at least 9 carbon atoms.

6. The resin composition as claimed in claim 1, wherein the resin composition is in a form of a masterbatch.

7. Heat-expandable microspheres comprising a thermoplastic resin shell and a thermally vaporizable blowing agent encapsulated therein;
   wherein the thermoplastic resin is a polymer of a polymerizable component containing N-substituted maleimide and a nitrile monomer containing methacrylonitrile;
   the total amount of N-substituted maleimide and methacrylonitrile in the polymerizable component ranges from 8 to 50 wt %, and
   the polymerizable component satisfies condition 1 below, condition 1: the amounts of the methacrylonitrile and N-substituted maleimide in the polymerizable component are represented by the following formula (I):

$$7 \geq \text{amount of N-substituted maleimide/amount of methacrylonitrile} \geq 0.5 \quad \text{Formula (I).}$$

8. The heat-expandable microspheres as claimed in claim 7, wherein the blowing agent contains a hydrocarbon having 8 carbon atoms.

9. The heat-expandable microspheres as claimed in claim 8, wherein the blowing agent further contains at least one hydrocarbon selected from hydrocarbons having 4 to 7 carbon atoms.

10. The heat-expandable microspheres as claimed in claim 9, wherein the blowing agent further contains at least one hydrocarbon selected from hydrocarbons having at least 9 carbon atoms.

11. Wet-powdery heat-expandable microspheres comprising the heat-expandable microspheres as claimed in claim 7 and a liquid compound.

12. A molded article manufactured by molding the resin composition as claimed in claim 1.

13. The molded article according to claim 12, wherein the molding comprises extrusion molding.

14. The molded article as claimed in claim 12, wherein the molded article is used as a sealing material for construction and automobiles, wall papers, shoe soles and floor materials.

15. A molded article manufactured by molding a mixture containing the resin composition as claimed in claim 6 and a matrix resin.

16. The molded article as claimed in claim 15, wherein said molding comprises extrusion molding.

17. The resin composition as claimed in claim 1, wherein the amount of carboxyl-group-containing monomers in the polymerizable component is less than 0.1 wt %.

18. The resin composition as claimed in claim 1, wherein the expansion initiation temperature (Ts) of the heat-expandable microspheres is not lower than 140° C. and the upper limit of the expansion initiation temperature is 190° C.

19. The heat-expandable microspheres as claimed in claim 7, wherein the amount of carboxyl-group-containing monomers in the polymerizable component is less than 0.1 wt %.

20. The heat-expandable microspheres as claimed in claim 7, wherein the expansion initiation temperature (Ts) of the heat-expandable microspheres is not lower than 140° C. and the upper limit of the expansion initiation temperature is 190° C.

* * * * *